US012725000B2

(12) United States Patent
Arora et al.

(10) Patent No.: US 12,725,000 B2
(45) **Date of Patent: *Sep. 1, 2026**

(54) SYSTEM AND METHOD FOR TRACKING TAGS OVER BLUETOOTH LOW ENERGY

(71) Applicant: Bluicity Inc., Grimsby (CA)

(72) Inventors: Pradeep Kumar Arora, Markham (CA); Sylvain Louchez, St. Catharines (CA)

(73) Assignee: Bluicity Inc., Grimsby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/864,963

(22) PCT Filed: May 11, 2023

(86) PCT No.: PCT/CA2023/050650
§ 371 (c)(1),
(2) Date: Nov. 12, 2024

(87) PCT Pub. No.: WO2023/220811
PCT Pub. Date: Nov. 23, 2023

(65) Prior Publication Data

US 2025/0315190 A1 Oct. 9, 2025

Related U.S. Application Data

(63) Continuation of application No. 17/745,099, filed on May 16, 2022, now Pat. No. 11,847,519.

(51) Int. Cl.
*G06K 19/077* (2006.01)
*G06F 3/06* (2006.01)
(Continued)

(52) U.S. Cl.
CPC ..... *G06K 19/07758* (2013.01); *G06F 3/0626* (2013.01); *G06F 3/0658* (2013.01);
(Continued)

(58) Field of Classification Search
CPC ........ G06K 19/07758; G06K 19/0723; H04W 4/80; G06F 3/0626; G06F 3/0658; G06F 3/0674; G06F 3/0661
See application file for complete search history.

(56) References Cited

U.S. PATENT DOCUMENTS 9,380,119 B2 6/2016 Kasslin
9,385,821 B2 7/2016 Jin
(Continued)

FOREIGN PATENT DOCUMENTS

CA 2991337 A1 7/2018
CA 3018453 A1 7/2018
(Continued)

OTHER PUBLICATIONS

English translation of DE-69930612-T22 (Year: 2006).*
(Continued)

*Primary Examiner* — Henry Tsai
*Assistant Examiner* — John B Roche
(74) *Attorney, Agent, or Firm* — Forsgren Fisher McCalmont DeMarea Tysver LLP; James Urzedowski; Daniel Tysver

(57) ABSTRACT

There is described a system and method for tracking a tag. The system and method includes a concentrator for receiving, via a one-way Bluetooth low energy (BLE) communication, at least one data packet broadcasted by a tag during a time slot assigned to the tag and identifying the tag based on the at least one data packet. The system and method also includes a gateway in communication with the concentrator for receiving the identification of the tag from the concentrator and outputting the identification of the tag.

18 Claims, 26 Drawing Sheets

(51) Int. Cl.
*G06K 19/07* (2006.01)
*H04W 4/80* (2018.01)

(52) U.S. Cl.
CPC ....... *G06F 3/0674* (2013.01); *G06K 19/0723* (2013.01); *H04W 4/80* (2018.02); *G06F 3/0661* (2013.01)

(56) References Cited

U.S. PATENT DOCUMENTS

| | | | | |
|---|---|---|---|---|
| 9,936,448 | B2 | 4/2018 | Lee | |
| 10,841,749 | B1 | 11/2020 | Catalena | |
| 11,071,279 | B2 | 7/2021 | Singh | |
| 2009/0185528 | A1* | 7/2009 | Sambhwani | .......... H04L 1/1835 370/329 |
| 2016/0196455 | A1 | 7/2016 | Gudan | |
| 2016/0254844 | A1 | 9/2016 | Hull | |
| 2016/0260301 | A1 | 9/2016 | Miller | |
| 2016/0341556 | A1 | 11/2016 | Lin et al. | |
| 2017/0063705 | A1* | 3/2017 | Gilson | .................. H04L 47/286 |
| 2017/0223579 | A1 | 8/2017 | Lee | |
| 2018/0077546 | A1 | 3/2018 | Arunachalam | |
| 2018/0196972 | A1 | 7/2018 | Lu | |
| 2018/0220335 | A1 | 8/2018 | Lee | |
| 2018/0288704 | A1 | 10/2018 | Patil | |
| 2019/0132301 | A1 | 5/2019 | Banga | |
| 2019/0294833 | A1 | 9/2019 | Lu et al. | |
| 2019/0303126 | A1 | 10/2019 | Juven | |
| 2019/0306200 | A1 | 10/2019 | Schwartz | |
| 2019/0354734 | A1 | 11/2019 | Forster | |
| 2019/0373472 | A1 | 12/2019 | Smith | |
| 2020/0100086 | A1 | 3/2020 | Curticapean | |
| 2020/0177517 | A1 | 6/2020 | Pancras | |
| 2020/0257865 | A1 | 8/2020 | Zarshchikov | |
| 2021/0014656 | A1 | 1/2021 | Mueck | |
| 2021/0051538 | A1 | 2/2021 | Huang | |
| 2021/0084448 | A1 | 3/2021 | Catalena | |
| 2021/0127439 | A1 | 4/2021 | Raphael | |
| 2021/0144517 | A1 | 5/2021 | Guim Bernat | |
| 2021/0185485 | A1 | 6/2021 | Deixler | |
| 2021/0319894 | A1 | 10/2021 | Sobol | |
| 2022/0014892 | A1 | 1/2022 | Bengtsson | |

FOREIGN PATENT DOCUMENTS

| | | | | |
|---|---|---|---|---|
| CN | 106291464 | A | 1/2017 | |
| DE | 69930612 | T2 * | 11/2006 | ............. H04B 1/715 |
| EP | 3349516 | A2 | 7/2018 | |
| EP | 3547615 | A1 | 2/2019 | |
| EP | 2463679 | B1 | 11/2020 | |
| ES | 2781589 | | 8/2017 | |
| FI | 129163 | B | 8/2021 | |
| JP | 2016218034 | A | 12/2016 | |
| JP | 6316256 | B2 | 4/2018 | |
| TW | 201642612 | A | 12/2016 | |
| WO | 2017018604 | A1 | 2/2017 | |

OTHER PUBLICATIONS

Translation of DE-69930612-T2 (Year: 2006).*

Feb. 17, 2023 USPTO Office Action (U.S. Appl. No. 17/745,099).

Emilio, M. Di Paolo, "Low-Power WAN (LPWAN) for IoT long-range communication", article, Sep. 18, 2019.

Wirepas, "The Best Mesh for Lot", website URL: www.wirepas.com.

Moko Smart, "Technical Working of LoRaWAN Technology", Jan. 8, 2020, URL: https://www.mokosmart.com/en/lorawan-technology/.

Qualcomm, Build a mesh network with Bluetooth Low Energy "BLE", URL: https://www.qualcomm.com/products/features/bluetooth-mesh.

Lorenzo Invidia et al., "An IoT-oriented Fast Prototyping Platform for BLE-Based Star Topology Networks", article, Apr. 24, 2019.

Torroglosa-Garcia, Elena M. et al., "Enabling Roaming Across Heterogeneous IoT Wireless Networks: LoRaWAN Meets 5G", article, May 28, 2020.

May 25, 2023 USPTO Office Action (U.S. Appl. No. 17/745,099).

Jul. 21, 2023 PCT International Search Report and Written Opinion. PCT/CA2023/050650.

Jul. 21, 2023 PCT Search Report (Serial No. ).

European Search Report (App No. 23806467.9), dated Mar. 31, 2026.

* cited by examiner 1000
104
1004
108
108
112
108
108

1300
104
108
108
112
108
108
104-P
1304

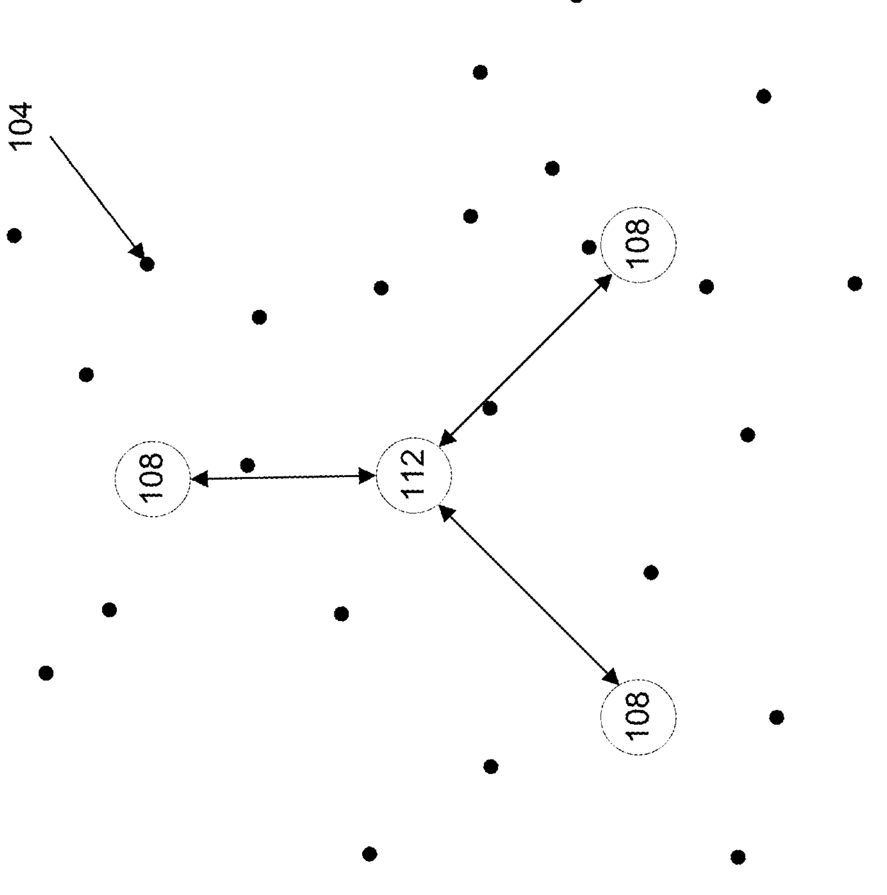
FIG. 14

| Frame Time Span (seconds) | | | discovery | One complete frame = 8.192 sec | | | | | | | | Total number of Tags serviced by one Gateway |
| --- | --- | --- | --- | --- | --- | --- | --- | --- | --- | --- | --- | --- |
| | | | | Tag fixed slot service - 16 Tags each Concentrator | | | | | | | | |
| | | | | C1 | | C2 | | C3 | | C4 | | |
| | | | | From Tag # | To Tag # | From Tag # | To Tag # | From Tag # | To Tag # | From Tag # | To Tag # | |
| Frame # | Start time | End Time | | | | | | | | | | |
| 1 | 0 | 8.192 | | 1 | 16 | 1 | 16 | 1 | 16 | 1 | 16 | 64 |
| 2 | 8.193 | 16.385 | | 17 | 32 | 17 | 32 | 17 | 32 | 17 | 32 | 128 |
| 3 | 16.385 | 24.577 | | 33 | 48 | 33 | 48 | 33 | 48 | 33 | 48 | 192 |
| 4 | 24.577 | 32.769 | | 49 | 64 | 49 | 64 | 49 | 64 | 49 | 64 | 256 |
| 5 | 32.769 | 40.961 | | 65 | 80 | 65 | 80 | 65 | 80 | 65 | 80 | 320 |
| 6 | 40.961 | 49.153 | | 81 | 96 | 81 | 96 | 81 | 96 | 81 | 96 | 384 |
| 7 | 49.153 | 57.345 | | 97 | 112 | 97 | 112 | 97 | 112 | 97 | 112 | 448 |
| 8 | 57.345 | 65.537 | | 113 | 128 | 113 | 128 | 113 | 128 | 113 | 128 | 512 |
| 9 | 65.537 | 73.729 | | 129 | 144 | 129 | 144 | 129 | 144 | 129 | 144 | 576 |
| 10 | 73.729 | 81.921 | | 145 | 160 | 145 | 160 | 145 | 160 | 145 | 160 | 640 |
| 11 | 81.921 | 90.113 | | 161 | 176 | 161 | 176 | 161 | 176 | 161 | 176 | 704 |
| 12 | 90.113 | 98.305 | | 177 | 192 | 177 | 192 | 177 | 192 | 177 | 192 | 768 |
| 13 | 98.305 | 106.497 | | 193 | 208 | 193 | 208 | 193 | 208 | 193 | 208 | 832 |
| 14 | 106.497 | 114.689 | | 209 | 224 | 209 | 224 | 209 | 224 | 209 | 224 | 896 |
| 15 | 114.689 | 122.881 | | 225 | 240 | 225 | 240 | 225 | 240 | 225 | 240 | 960 |
| 16 | 122.881 | 131.073 | | 241 | 256 | 241 | 256 | 241 | 256 | 241 | 256 | 1024 |
| 17 | 131.073 | 139.265 | | 257 | 272 | 257 | 272 | 257 | 272 | 257 | 272 | 1088 |
| 18 | 139.265 | 147.457 | | 273 | 288 | 273 | 288 | 273 | 288 | 273 | 288 | 1152 |
| 19 | 147.457 | 155.649 | | 289 | 304 | 289 | 304 | 289 | 304 | 289 | 304 | 1216 |
| 20 | 155.649 | 163.841 | | 305 | 320 | 305 | 320 | 305 | 320 | 305 | 320 | 1280 |
| 21 | 163.841 | 172.033 | | 321 | 336 | 321 | 336 | 321 | 336 | 321 | 336 | 1344 |
| 22 | 172.033 | 180.225 | | 337 | 352 | 337 | 352 | 337 | 352 | 337 | 352 | 1408 |
| 23 | 180.225 | 188.417 | | 353 | 368 | 353 | 368 | 353 | 368 | 353 | 368 | 1472 |
| 24 | 188.417 | 196.609 | | 369 | 384 | 369 | 384 | 369 | 384 | 369 | 384 | 1536 |
| 25 | 196.609 | 204.801 | | 385 | 400 | 385 | 400 | 385 | 400 | 385 | 400 | 1600 |
| 26 | 204.801 | 212.993 | | 401 | 416 | 401 | 416 | 401 | 416 | 401 | 416 | 1664 |
| 27 | 212.993 | 221.185 | | 417 | 432 | 417 | 432 | 417 | 432 | 417 | 432 | 1728 |
| 28 | 221.185 | 229.377 | | 433 | 448 | 433 | 448 | 433 | 448 | 433 | 448 | 1792 |
| 29 | 229.377 | 237.569 | | 449 | 464 | 449 | 464 | 449 | 464 | 449 | 464 | 1856 |
| 30 | 237.569 | 245.761 | | 465 | 480 | 465 | 480 | 465 | 480 | 465 | 480 | 1920 |
| 31 | 245.761 | 253.953 | | 481 | 496 | 481 | 496 | 481 | 496 | 481 | 496 | 1984 |
| 32 | 253.953 | 262.145 | | 497 | 512 | 497 | 512 | 497 | 512 | 497 | 512 | 2048 |
| | | | | | | | | | | | | |
| 64 | 516.098 | 524.29 | | | | | | | | | | 4096 |
| | | | | | | | | | | | | |
| 128 | 1040.388 | 1048.58 | | | | | | | | | | 8192 |
| | | | | | | | | | | | | |
| 256 | 2088.968 | 2097.16 | | | | | | | | | | 16384 |

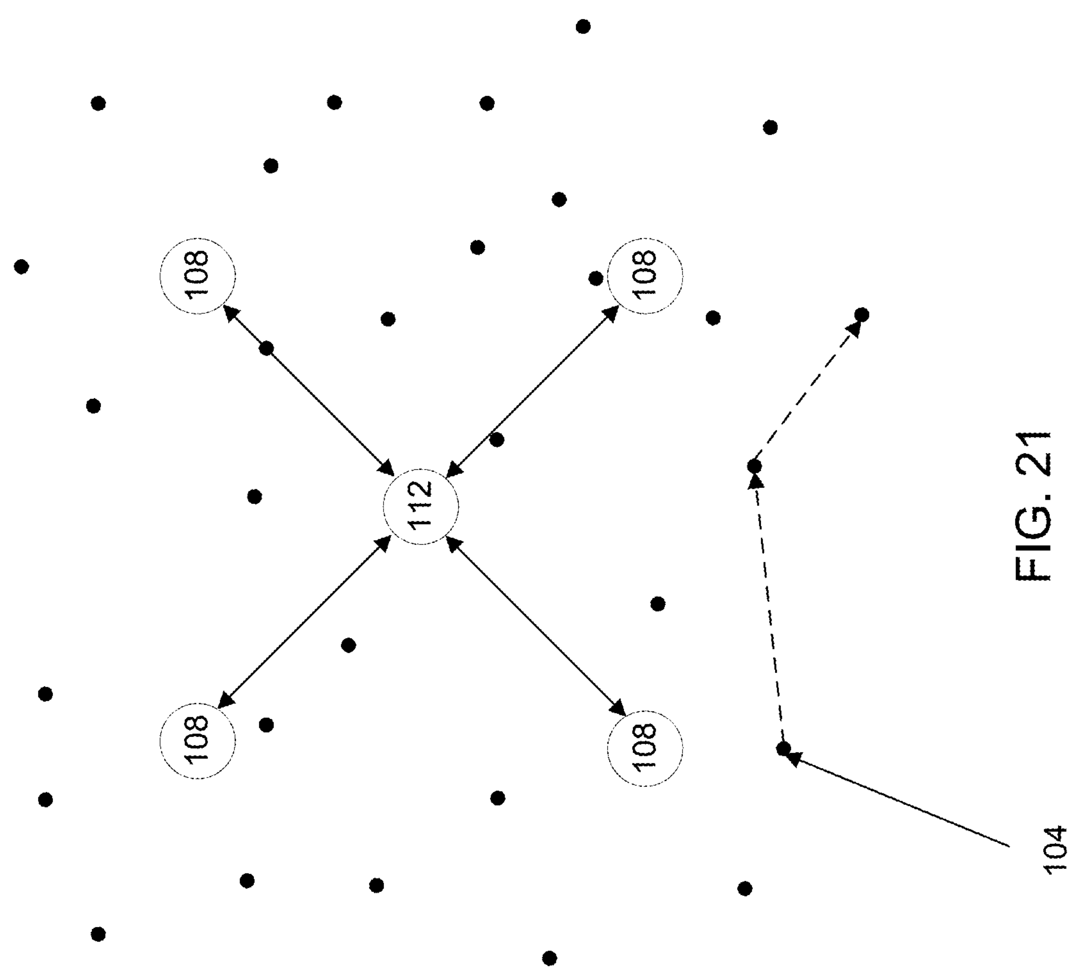
FIG. 21

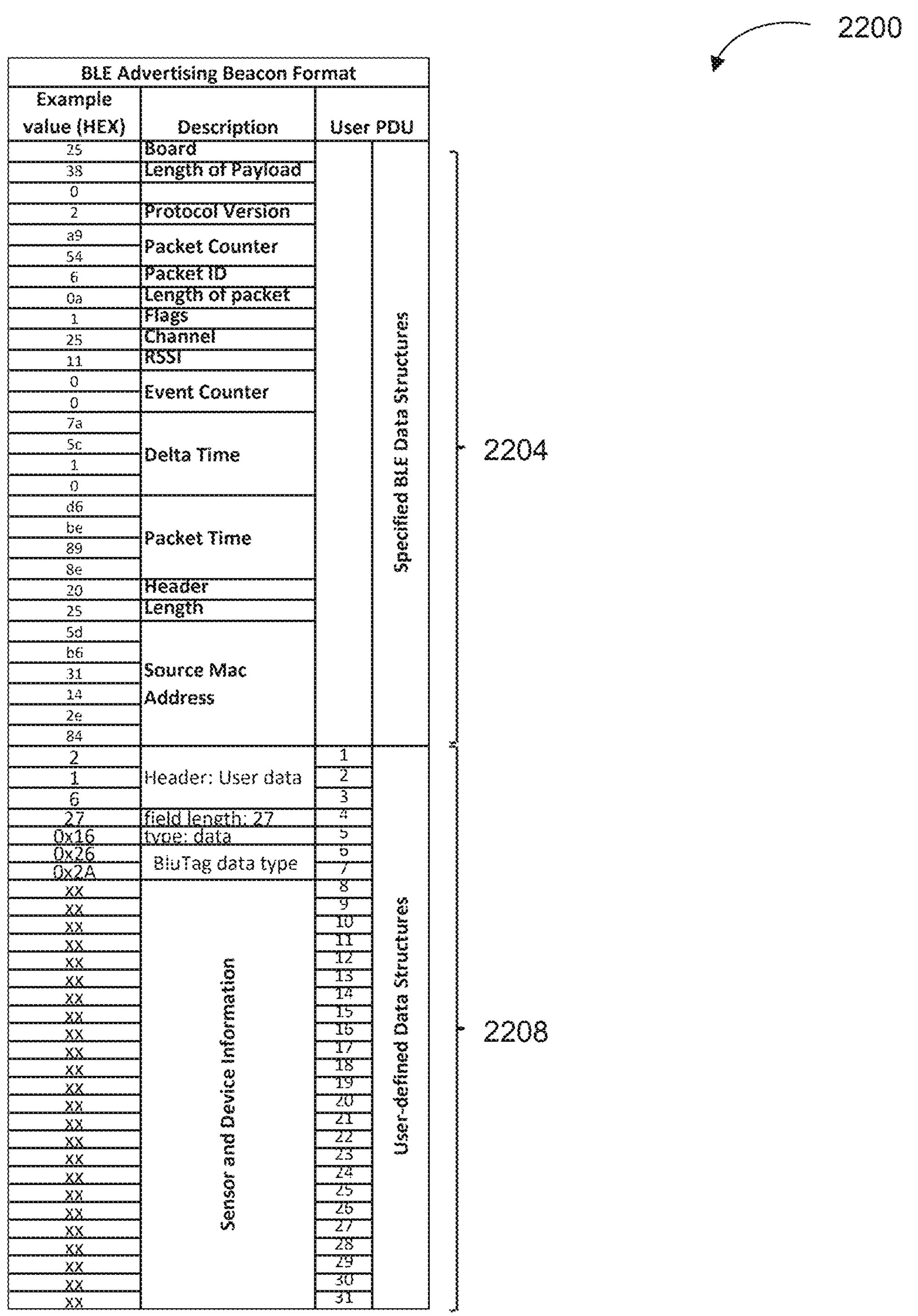

BLE Advertising Beacon Format

| Example value (HEX) | Description | User PDU | |
|---|---|---|---|
| 25 | Board | | Specified BLE Data Structures |
| 38 | Length of Payload | | |
| 0 | | | |
| 2 | Protocol Version | | |
| a9 | Packet Counter | | |
| 54 | | | |
| 6 | Packet ID | | |
| 0a | Length of packet | | |
| 1 | Flags | | |
| 25 | Channel | | |
| 11 | RSSI | | |
| 0 | Event Counter | | |
| 0 | | | |
| 7a | Delta Time | | |
| 5c | | | |
| 1 | | | |
| 0 | | | |
| d6 | Packet Time | | |
| be | | | |
| 89 | | | |
| 8e | | | |
| 20 | Header | | |
| 25 | Length | | |
| 5d | Source Mac Address | | |
| b6 | | | |
| 31 | | | |
| 14 | | | |
| 2e | | | |
| 84 | | | |
| 2 | Header: User data | 1 | User-defined Data Structures |
| 1 | | 2 | |
| 6 | | 3 | |
| 27 | field length: 27 | 4 | |
| 0x16 | type: data | 5 | |
| 0x26 | BluTag data type | 6 | |
| 0x2A | | 7 | |
| xx | Sensor and Device Information | 8 | |
| xx | | 9 | |
| xx | | 10 | |
| xx | | 11 | |
| xx | | 12 | |
| xx | | 13 | |
| xx | | 14 | |
| xx | | 15 | |
| xx | | 16 | |
| xx | | 17 | |
| xx | | 18 | |
| xx | | 19 | |
| xx | | 20 | |
| xx | | 21 | |
| xx | | 22 | |
| xx | | 23 | |
| xx | | 24 | |
| xx | | 25 | |
| xx | | 26 | |
| xx | | 27 | |
| xx | | 28 | |
| xx | | 29 | |
| xx | | 30 | |
| xx | | 31 | |

FIG. 22

| Column | Type |
|---|---|
| state | character(1) |
| ble_payload_header_seqnum | character varying(3) |
| ble_payload_header_mac_add | character(12) |
| envir_msg_shock_cnt | character(4) |
| envir_msg_temperature | character(4) |
| envir_msg_battery | character(2) |
| envir_msg_humidity | character(2) |
| envir_msg_rss | character(2) |
| envir_msg_ap_rssi | character(2) |
| record_id | integer |
| valid | character varying(1) |
| original_record_id | integer |
| log_time | timestamp without time zone |
| original_log_time | timestamp without time zone |
| envir_msg_sampletime | timestamp without time zone |

FIG. 24

SYSTEM AND METHOD FOR TRACKING TAGS OVER BLUETOOTH LOW ENERGY

TECHNICAL FIELD

The present disclosure relates to a system and method for tracking tags, and, in particular, using one way Bluetooth low energy communication signals to track tags.

BACKGROUND

Volumes of transportation and distribution of goods and assets have been increasing substantially all across the globe. As such, the importance of tracking goods and assets as they travel through supply chains has increased substantially as well. The tracking and monitoring of goods provide users with better visibility in the supply chain, and also provide an increased agility in the supply chain, allowing users to track issues as they arise and to efficiently deal with the issues.

However, in many of these industries, tracking and monitoring supply chains remain complex due to the complexity of the supply chain and the multiple locations and/or facilities that may be involved. Furthermore, as supply chains grow larger, typically the distance that assets and goods need to travel becomes further, and as a result, take longer to reach their destination of the next facility. In addition, once an asset or good does reach a facility, there may be specific storage requirements and/or there may be many assets or goods stored at the same facility.

In many cases, sensors and tags may be used to track and monitor goods as they travel through the supply chain. However, despite this, in many cases, systems may be overwhelmed by the number of tags in an area. Furthermore, sensor data may be lost when there is interference or corruption of data in facilities where there are plenty of obstacles and moving objects. In addition, tags travelling long distances or travelling for long periods of times in expansive supply chains may run out of power, and as such, lose its ability to track or gather sensor data.

SUMMARY

According to various aspects of the present technology, there is provided a tag including a communication interface configured to receive and transmit data over Bluetooth low energy (BLE), a processor configured to generate at least one data packet, the at least one data packet comprising at least a unique tag identification (ID) associated with the tag and a device ID associated with a device to which the at least one data packet is intended. The processor is further configured to broadcast the at least one data packet via one-way BLE communication using the communication interface during a time slot assigned to the tag, the time slot defining a period of time during which the tag is allowed to transmit and receive data. The tag further includes a memory configured to store the unique tag ID, and a power source.

The processor of the tag may further be configured to receive the time slot.

The processor of the tag may further be configured for generating at least one discovery packet, the at least one discovery packet comprising at least the unique tag ID, broadcasting the at least one discovery packet via the one-way BLE communication using the communication interface, and receiving a discovery confirmation packet including the time slot and the device ID.

The processor of the tag may further be configured for powering the communication interface only during the time slot.

The time slot assigned to the tag may repeat at predetermined intervals.

The at least one data packet may comprise sensor data, the sensor data being received from at least one sensor.

The tag may further include at least one sensor, the sensor configured to sense at least one parameter to generate the sensor data.

Where the at least one data packet comprises a plurality of data packets, each one of the data packets comprises a respect data packet ID.

The processor of the tag may be further configured for receiving an identification of at least one of the data packets that was not received by the device, and broadcasting again the at least one of the data packets that was not received via the one-way BLE communication using the communication interface during the time slot assigned to the tag.

The receiving of the identification may include receiving a confirmation packet comprising one bit for each one of the data packets, each bit indicating whether its corresponding data packet has been received.

According to various aspects to the present technology, there is provided a device for identifying a tag. The device includes a communication interface configured to receive and transmit data over Bluetooth low energy (BLE), a memory for storing at least a device identification (ID) associated with the at least one device and at least one processor. The processor is configured for receiving, via one-way Bluetooth low energy (BLE) communication, at least one data packet broadcasted by a tag during a time slot assigned to the tag, identifying the tag based on the at least one data packet and outputting the identification of the tag.

The at least one data packet may include at least a unique tag ID associated with the tag and the device ID.

The time slot assigned to the tag may repeat at predetermined intervals.

The processor of the device may further be configured for determining the time slot and broadcasting the time slot via the one-way BLE communication along with the device ID.

The processor of the device may be further configured for receiving a discovery packet broadcasted by the tag, the discovery packet comprising at least the unique tag ID prior to determining the time slot. The determining of the time slot is performed in response to said receiving the discovery packet and said broadcasting the time slot comprises generating a discovery confirmation packet comprising the time slot and the device ID and broadcasting the discovery confirmation packet via the one-way BLE communication.

The at least one data packet may further include sensor data, and the processor of the device may be further configured storing the sensor data and the unique tag ID on the memory, and transmitting the sensor data and the unique tag ID to an external server.

The at least one data packet may further include a plurality of data packets, each one of the data packets including a respective data packet ID.

The processor of the device may further be configured for identifying at least one additional packet that was sent by the tag and is missing from the received data packets, thereby identifying at least one non-received packet, and broadcasting the identification of the at least one non-received packet along with the unique tag ID and the device ID via the one-way BLE communication during the time slot.

In addition, the processor of the device may be further configured for generating a confirmation packet being indicative of the data packet ID of the data packets that were received by the device, the identification of the at least one non-received packet, the unique tag ID and the device ID and broadcasting the confirmation packet via the one-way BLE communication during the time slot.

In addition, the confirmation packet may include a plurality of bits each associated with a respective packet, the packet being one of: one of the data packets and one of the at least one non-received packet, each bit indicating whether its respective packet has been received.

According to various aspects to the present technology, there is provided a system for tracking a tag, the system including a concentrator for receiving, via a one-way Bluetooth low energy (BLE) communication, at least one data packet broadcasted by a tag during a time slot assigned to the tag and identifying the tag based on the at least one data packet. The system further includes a gateway in communication with the concentrator for receiving the identification of the tag from the concentrator and outputting the identification of the tag.

The gateway may be further configured for determining a position of the tag based on a position of the concentrator.

The gateway may be further configured for determining of the position of the tag as being the position of the concentrator.

The gateway and concentrator may be further configured to communication together using a given communication other than one-way BLE communication.

The at least one data packet may include at least a unique tag ID associated with the tag and a concentrator identification (ID) associated with the concentrator.

The time slot assigned to the tag may repeat at predetermined intervals.

The gateway may be further configured for determining the time slot and the concentrator is further configured for receiving the time slot from the gateway and broadcasting the time slot to the tag via the one-way BLE communication along with the concentrator ID.

The concentrator may be further configured for receiving a discovery packet broadcasted by the tag via the one-way BLE communication, the discovery packet comprising at least the unique tag ID, transmitting the unique tag ID to the gateway, upon reception of the time slot from the gateway, generating a discovery confirmation packet comprising the time slot and the concentrator ID, and broadcasting the discovery confirmation packet via the one-way BLE communication prior to determining the time slot.

The at least one data packet may also include sensor data, and the concentrator may further be configured for transmitting to the gateway the sensor data along with the unique tag ID. The gateway may also be further configured for locally storing the sensor data and the unique tag ID and/or transmitting the sensor data and the unique tag ID to an external server.

The at least one data packet may further include a plurality of data packets, where each one of the data packets may include a respective data packet ID.

The gateway may be further configured for identifying at least one additional packet that was sent by the tag and is missing from the received data packets, thereby identifying at least one non-received packet; and the concentrator is further configured for broadcasting the identification of the at least one non-received packet along with the unique tag ID and the concentrator ID via the one-way BLE communication during the time slot.

The concentrator may also be further configured for generating a confirmation packet being indicative of the data packet ID of the data packets that were received by the device, the identification of the at least one non-received packet, the unique tag ID and the device ID, and broadcasting the confirmation packet via the one-way BLE communication during the time slot.

The confirmation packet may include a plurality of bits each associated with a respective packet, the packet being one of: one of the data packets and one of the at least one non-received packet, each bit indicating whether its respective packet has been received.

According to various aspects to the present technology, there is provided a computer-implemented method for tracking a tag. The method includes receiving at a device via one-way Bluetooth low energy (BLE) communication through a communication interface, at least one data packet broadcasted by a tag during a time slot assigned to the tag, identifying the tag based on the at least one data packet, and outputting the identification of the tag.

The at least one data packet may include at least a unique tag ID associated with the tag and the device ID.

The time slot assigned to the tag may repeat at predetermined intervals.

The computer-implemented method may further include determining, by the processor of the device, the time slot and broadcasting the time slot to the tag via the one-way BLE communication along with the device ID.

The computer-implemented method may further include receiving a discovery packet broadcasted by the tag, the discovery packet comprising at least the unique tag ID prior to determining the time slot, where the determining of the time slot is performed in response to said receiving the discovery packet and said broadcasting the time slot comprises generating a discovery confirmation packet comprising the time slot and the device ID and broadcasting the discovery confirmation packet via the one-way BLE communication.

The at least one data packet may also include sensor data. The computer-implemented method may further include storing the sensor data and the unique tag ID on a memory and transmitting the sensor data and the unique tag ID to an external server.

The at least one data packet may also include a plurality of data packets, where each one of the data packets includes a respective data packet ID.

The computer-implemented method may further include identifying at least one additional packet that was sent by the tag and is missing from the received data packets, thereby identifying at least one non-received packet, and broadcasting the identification of the at least one non-received packet along with the unique tag ID and the device ID via the one-way BLE communication during the time slot.

The computer-implemented method may also include generating a confirmation packet being indicative of the data packet ID of the data packets that were received by the device, the identification of the at least one non-received packet, the unique ID and the device ID, and broadcasting the confirmation packet via the one-way BLE communication during the time slot.

The confirmation packet may include a plurality of bits each associated with a respective packet, the packet being one of: one of the data packets and one of the at least one non-received packet, each bit indicating whether its respective packet has been received.

According to various aspects of the present technology, there is provided a computer-implemented method for tracking a tag. The computer-implemented method includes generating at least one data packet, the at least one data packet comprising at least a unique tag identification (ID) associated with the tag and a device ID associated with a device to which the at least one data packet is intended, and broadcasting the at least one data packet via one-way Bluetooth low energy (BLE) communication during a time slot assigned to the tag, the time slot defining a period of time during which the tag is allowed to transmit and receive data.

The computer-implemented method may further include receiving the time slot.

The computer-implemented method may further include generating at least one discovery packet, the at least one discovery packet comprising at least the unique tag ID, broadcasting the at least one discovery packet via the one-way BLE communication, and receiving a discovery confirmation packet including the time slot and the device ID.

The computer-implemented method may also include powering a communication interface of the tag configured to receive and transmit data over BLE only during the time slot.

The time slot assigned to the tag may repeat at predetermined intervals.

The at least one data packet may further include sensor data, the sensor data being received from at least one sensor.

The at least one data packet may include a plurality of data packets, where each one of the data packets may include a respective data packet ID.

The computer-implemented method may also include receiving an identification of at least one of the data packets that was not received by the device, and broadcasting again the at least one of the data packets that was not received via the one-way BLE communication during the time slot assigned to the tag.

The receiving the identification, may include receiving a confirmation packet comprising one bit for each one of the data packets, each bit indicating whether its corresponding data packet has been received.

BRIEF DESCRIPTION OF THE DRAWINGS

The embodiments of the present technology shall be more clearly understood with reference to the following detailed description of the embodiments of the technology taken in conjunction with the accompanying drawings, in which:

FIG. 14 depicts an example top view of a schematic layout of a gateway and three concentrators;

FIG. 21 depicts an example top view of a schematic layout of a gateway and four concentrators, where a tag is moved from the coverage of a first concentrator to the coverage of a second concentrator;

FIG. 22 depicts an example advertising packet that is sent and received between the tags and the concentrators;

FIG. 24 depicts an example of the data schema of the data being logged in the gateway;

DESCRIPTION OF THE PREFERRED EMBODIMENTS

Figure 1:
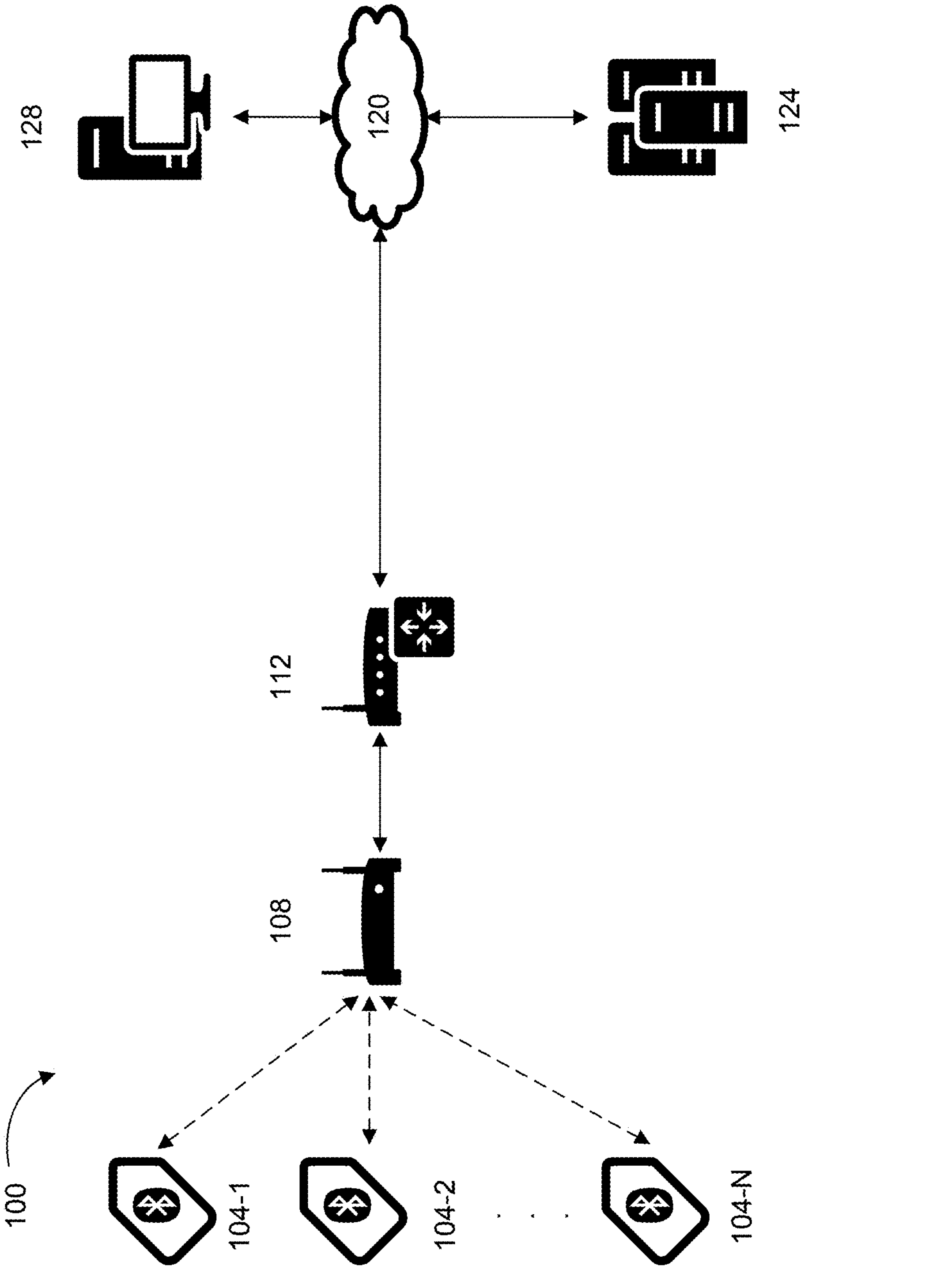
FIG. 1 depicts an example system for the tracking and gathering of sensor data from tags attachable to assets in a supply chain.

The description, which follows, and the embodiments described therein are provided by way of illustration of an example, or examples of particular embodiments of principles and aspects of the present technology. These examples are provided for the purposes of explanation and not of limitation, of those principles of the technology. In the description that follows, like parts are marked throughout the specification and the drawings with the same respective reference numerals.

By way of general overview, there is provided a system of a logistical and tracking network using Bluetooth low energy tags, with assured data delivery and an adjustable area of coverage. In at least some embodiments, the advantage of the system as described below is that while Bluetooth low energy is inherently unreliable for transmitting data, the system includes the ability to ensure that data is delivered. In addition, the system as described below may further have the advantage of being flexible and scalable based on the density of items being tracked, and furthermore may ensure that there is seamless roaming of items being tracked without substantially any loss of data and with minimum latency.

More specifically, the system uses a plurality of tags that are associated with assets to be tracked. The tags may be placed on or adhered to goods to be tracked. The tags include sensors that measure the environment around them, such as temperature, humidity and pressure, to ensure that the goods are shipped under satisfactory conditions. The tags use Bluetooth low energy to transmit the sensor data to concentrators when in range. When transmitting the information, the Bluetooth low energy tags communicate with the concentrator using a "Beacon mode", in which one-way communication is used. A combination of the beacon mode communication and accurate timing for the concentrator and the tags to be in receiving and sending mode, allow for power savings in comparison to regular Bluetooth communication methods, hence improving the overall battery lifespan of the tags. In addition, methods are in place to ensure that despite the use of one-way communication, that data delivery is ensured and that no data or information is lost during transfer.

Once it is received by the concentrator, the information collected from the tags is relayed to gateways, where the information may then be stored on servers, which can be accessed from client terminals.

FIG. 1 depicts a system 100 for tracking and receiving sensor data from tags over a logistical network. More specifically, system 100 includes the use of Bluetooth low energy (BLE) to retrieve sensor data from a plurality of tags that may be mobile, while ensuring that sensor data is captured in a reliable manner. In the illustrated embodiment, the system 100 includes tags 104-1, 104-2 . . . 104-N. (Tags 104 are referred to here generically as tag 104 and collectively as tags 104. This nomenclature is used elsewhere herein.) System 100 further includes concentrator 108, gateway 112, wide area network 120, at least one data server 124, and client terminals 128. Tags 104 exchange information wirelessly with concentrator 108, which relays information to gateway 112. Gateway 112 is connected to a communication network such as WAN 120, and may send data to data servers 124, which may be accessed via client terminals 128 over the communication network. Components of system 100 will be discussed further in detail below.

Figure 7:
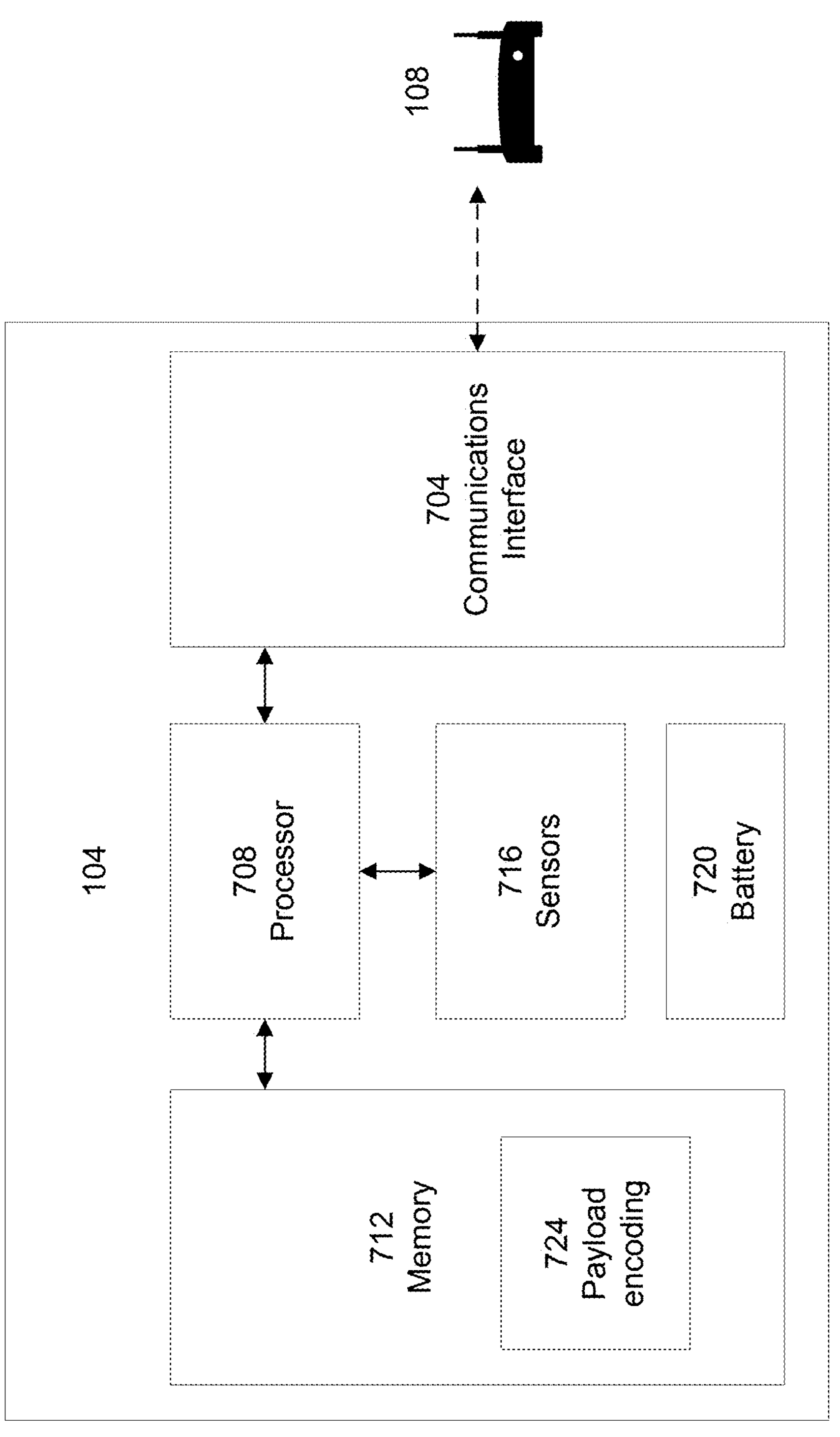
FIG. 7 depicts an example tag, where the tag includes a battery, a communication interface, a processor, sensors, and a memory, the memory including a payload encoder.

Tags 104 may be attached to assets within a logistic network. This includes attaching tags 104 to pallets, bins, or the entity itself for example. Referring to FIG. 7, there is illustrated an exemplary tag 104 which includes a processor 708 interconnecting a memory 712 and a communication interface 708. The processor 708 can include a central-processing unit (CPU), a graphics processing unit (GPU), a microcontroller, a microprocessor, a processing core, a field-programmable gate array (FPGA), or similar. In some embodiments, the processor 708 can include multiple cooperating processors. The processor 708 can cooperate with non-transitory computer readable medium, such as the memory 712 to execute instructions to realize the functionality discussed herein.

The memory 712 can include a combination of volatile memory (e.g. Random Access Memory or RAM) and non-volatile memory (e.g. non-volatile random-access memory, read only memory or ROM, Electrically Erasable Programmable Read Only memory or EEPROM, flash memory). All or some of the memory 712 can be integrated with processor 708. Memory 712 stores computer readable instructions for execution by processor 708.

In some embodiments, memory 712 stores a plurality of computer-readable data and programming instructions, accessible by processor 708, in the form of software objects, such as various applications, queries or types of data for use during the execution of those applications. In particular, the execution of the instructions in memory 712 by processor 708 retrieves sensor data from sensors 716, and transmits the sensor data to concentrator 108 via communication interface 704 under specific conditions that will be further discussed below. In addition, the execution of the instructions in memory 712 by processor 708 may also transmit warnings or alarms should sensor data retrieved surpass certain predetermined thresholds or exceed predetermined ranges. The person skilled in the art will now recognize that various forms of computer-readable programming instructions stored in memory 712 can be executed by processor 708 as applications or queries.

In at least some embodiments, memory 712 also stores sensor data from sensors 716. Sensor data may be stored in a database within memory 712. In order to preserve memory capacity and to limit the power requirements of tag 104, sensor data is stored until there is a confirmation of receipt of the sensor data from gateway 112. Once there is confirmation of receipt of the sensor data, the sensor data may be deleted from memory 712. Alternative conditions for the deletion of sensor data are possible, and may be discussed further below.

In at least some embodiments, memory 712 further stores payload encoding and security 724. Payload encoding and security 724 allows for data to be encoded as advertising packets (also referred to herein as data packets) with user-defined content. Data may also be encrypted for transmission. Advertising packets may then be transmitted via communication interface 704. Payload encoding and security 724 may also decode advertising packets received via communication interface 704.

Figure 23:
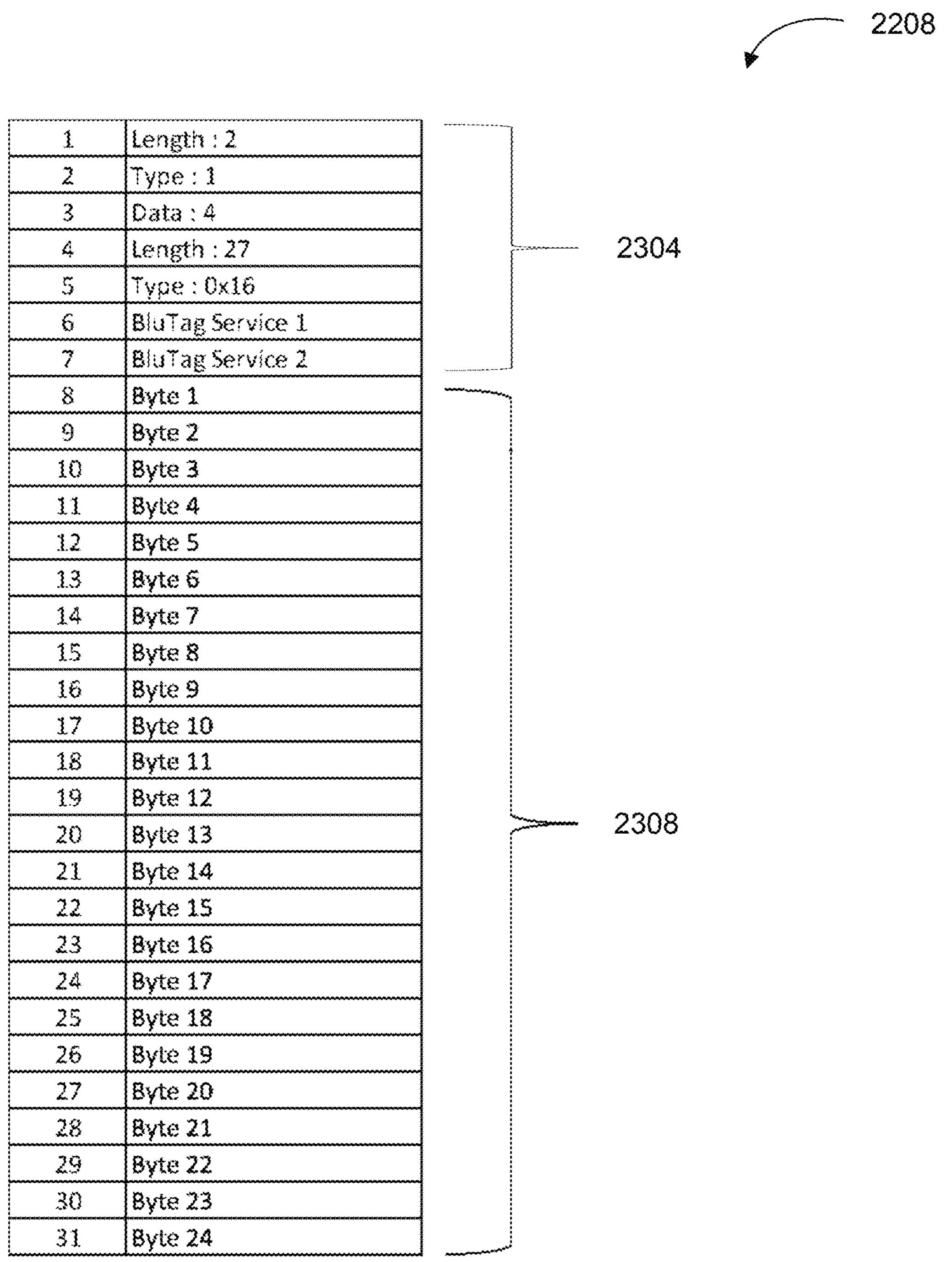
FIG. 23 depicts an example user defined data structure that is part of the advertising packed of FIG. 22.

An exemplary advertising packet schema 2200 may be seen in FIG. 22, which includes a 29-byte BLE unencrypted protocol field 2204 for the basic operation of a BLE network, and a 31-byte BLE sensor data field 2208 that provides sensor data from tag 104. The 31-byte BLE sensor data field 2208, as depicted in FIG. 23, includes a 7-byte header BLE option flag 2304, and a sensor data field 2308, where sensor data field 2308 are bytes 8 to 31 and contain the encrypted sensor data payload. The unique tag ID, the destination concentrator ID, the advertising packet ID and the batch state are all within sensor data field 2308.

As previously indicated, advertising packets are transmitted via communications 704. More specifically, advertising packets are broadcast wirelessly over one way BLE communication signal, specifically on BLE channels 37, 38 and 39. As can be seen in FIG. 1, tags 104 are wirelessly connected to concentrators 108 over BLE communication. As such, in the current embodiment, where BLE communication is used between tags 104 and concentrators 108, communication is performed through the use of advertising packets being broadcast from tags 104, and being received by concentrators 108, and similarly being broadcast from concentrators 108 and being received by tags 104. Tags 104 and concentrators 108 toggle or alternate between sending mode to broadcast advertising packets, and receiving mode to receive broadcasts. More specifically, while tags 104 are in sending mode to broadcast advertising packets and concentrators 108 are in receiving mode to receive said broadcast of advertising packets. Similarly, while concentrators 108 are in sending mode to broadcast advertising packets, and tags 104 are in receiving mode to receive said broadcast of advertising packets.

Returning to FIG. 7 and in at least some embodiments, tag 104 also includes at least one sensor 716. Sensors 716 may be connected to processor 708. In other embodiments that are not depicted, sensors 716 may be connected to processor 708 via communication interface 704. Processor 708 may receive sensor data from sensors 716, and sensor data may be stored in memory 712. Sensors 716 may include, but is not limited to, sensors adapted to measure temperature, humidity, air pressure, light, motion, and shock. As previously stated, tag 104 may be placed on pallets, bins, or the entities themselves. Sensors 716 allow the measuring and monitoring of conditions of the assets that tags 104 are associated with, or the environment surrounding the assets that tags 104 are associated with. For example, tag 104 may be attached to a pallet of dry goods, or may be placed in a container with dried goods. Sensors 716 on tag 104 may monitor humidity, so as to ensure that the dried goods remain dry. In another example, tag 104 may be placed inside the packaging of vacuumed goods, where sensor 716 may measure air pressure, to ensure that the packaging remains intact. The person skilled in the art will recognize the various combinations of sensors 716 on tags 104, and the various resulting uses and placements of tags 104.

Tags 104 also include battery 720. Battery 720 acts as a power source for tag 104, and provides power to memory 712, processor 708, sensors 716, and communication interface 704. Battery 720 may be one time use, or rechargeable. As will be described below, the use of one-way BLE communications in beacon mode allows for lower power consumption compared to the use of two-way BLE communications, allowing for an increase of lifespan of tag 104 using battery 720 in comparison to a standard Bluetooth tag. However, given that tags 104 may remain attached to or associated with an asset in transport for a significant duration of time, it is preferred that battery 104 may accommodate for that duration of time.

Communication interface 704 allows for processor 708 to wirelessly send information such as sensor data and other information to concentrator 108 via advertising packets as encoded by payload encoding and security 724. Communication interface 704 may use BLE 4.0 or newer versions to send and receive data between tag 104 and concentrator 108. The BLE 4.0 standard supports two modes of communication: "Beacon Mode" and "Connected Mode". Beacon mode includes one-way communication, where the receiver receives the one-way communication. Connected mode includes two-way communication emulating a client-server model where there is an establishment of data encryption and the service type, such as read, write, with response or without response. In the current embodiment, communication interface 704 uses BLE 4.0 in the beacon mode of transmission. In some embodiments and while not limited to using BLE 4.0, BLE 4.0 is the preferred method of transmission. BLE 4.0, especially in the beacon mode of transmission, has a low power usage. With a one-way beacon mode of communication, tag 104 needs only send advertising packets, data or other transmissions out, and then put itself into a receiving mode for a short period of time to listen for incoming responses, in comparison to a two-way connected mode of communication, where a connection would need to be established first between tag 104 and concentrator 108, using up the valuable power of battery 720.

Returning to FIG. 1, concentrator 108 receives data wirelessly from and transmits data wirelessly to tags 104. Concentrator 108 also receives data and transmits data to gateway 112. More specifically, data received from tag 104 may be decrypted, decoded and relayed to gateway 112, and data received from gateway 112 may be processed, encrypted and relayed to tag 104.

Data that is sent and received between tags 104 and concentrator 108 are in the form of advertising packets in order to conform to the BLE communication standards when in beacon mode. More specifically, data that is sent and received between tags 104 and concentrator 108 may be broadcast and received over BLE advertising channels, specifically BLE channel numbers 37, 38 and 39. In some embodiments, the advertising packets are also encrypted to ensure that any data that is captured over the air by sniffers or other tools, cannot be readily used and remains confidential. Advertising packets are used for communication between tags 104 and concentrator 108 to save the battery power of tags 104. Data that is sent and received between concentrator 108 and gateway 112 may remain unencrypted and in any format if concentrator 108 and gateway 112 are connected via a hardline. If concentrator 108 and gateway 112 are connected wirelessly, then data may be encrypted to prevent being readily used if captured over the air. This will be further discussed below.

Figure 8:
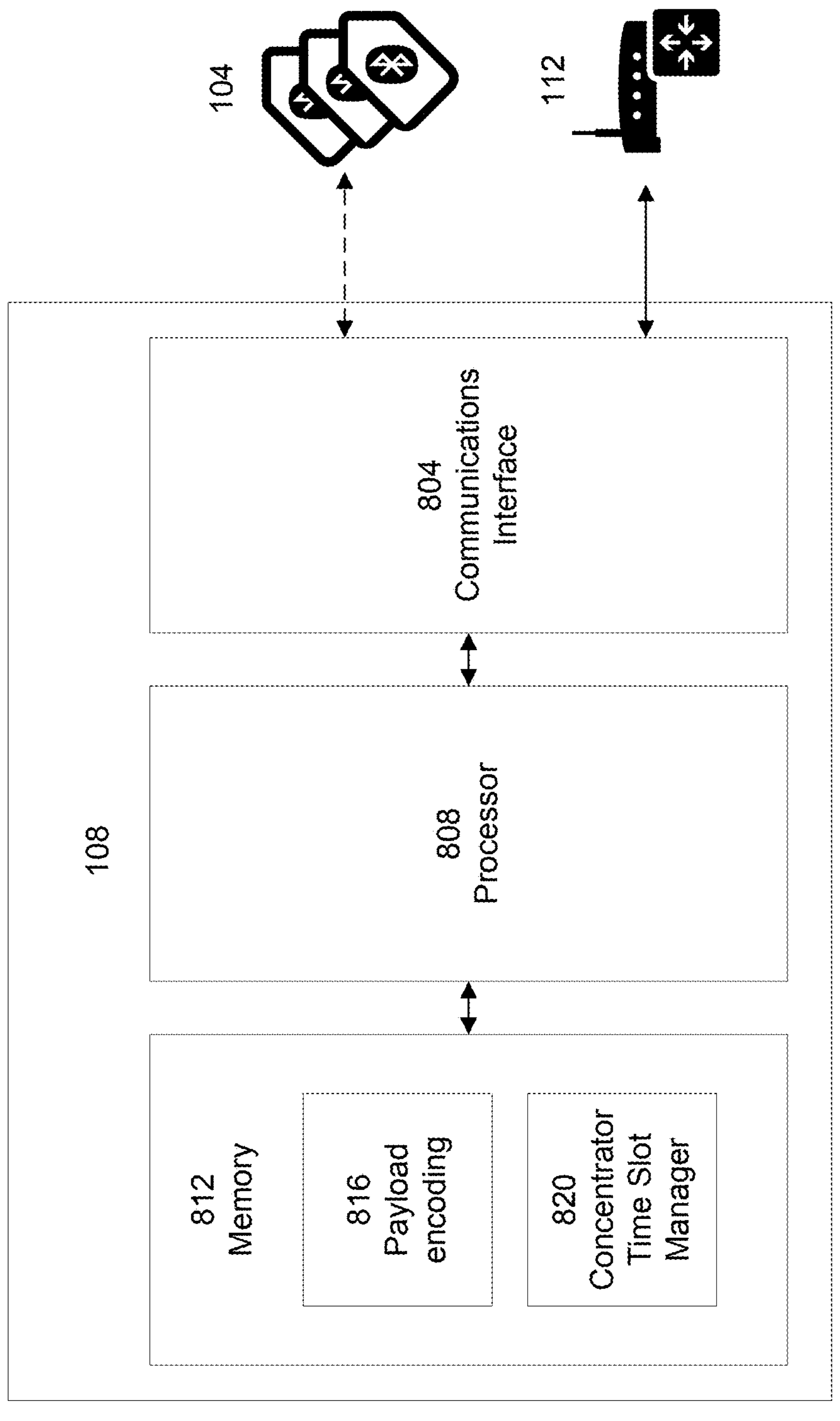
FIG. 8 depicts an example concentrator, where the concentrator includes a communication interface, a processor, and a memory, the memory including a payload encoder and a concentrator time slot manager.

Referring to FIG. 8, a concentrator 108 includes a processor 808 interconnecting a memory 812 and a communication interface 804. Similar to processor 708 of tag 104, processor 808 can include a CPU, a GPU, a microcontroller, a microprocessor, a processing core, a field-programmable gate array (FPGA), or similar. Processor 808 can include multiple cooperating processors. Processor 808 can also cooperate with non-transitory computer readable medium such as memory 812 to execute instructions to realize the functionality discussed below.

Memory 812 can include a combination of volatile memory (e.g. Random Access Memory or RAM) and non-volatile memory (e.g. non-volatile random access memory, read only memory or ROM, Electrically Erasable Programmable Read Only memory or EEPROM, flash memory). All of some of memory 812 can be integrated with processor 808. Memory 812 stores computer readable instructions for execution by processor 708.

In particular, memory 812 stores a plurality of computer-readable data and programming instructions, accessible by processor 808, in the form of software objects, such as applications, queries or types of data for use during the execution of those applications. In particular, the execution of instructions in memory 812 by processor 808 instructs processor 808 to decode and decrypt advertising packets received from tags 104 before relaying the decoded and decrypted data to gateway 112 through communication interface 804. Memory 812 may also contain instructions for processor 808 to convert data received from gateway 112 into encrypted advertising packets to be sent to tags 104.

For example, tag 104 may send advertising packets including sensor data based on a system clock on tag 104, or at predetermined time intervals. The advertising packets may include the unique tag ID and also a unique advertising packet ID. Communication interface 804 may receive the advertising packets if concentrator 108 is within BLE 4.0 range of tag 104. Advertising packets received by concentrator 108 may then be decoded and decrypted, and the sensor data forwarded to gateway 112 along with the tag ID and the advertising packet ID. In other embodiments in which the concentrator 108 has a fixed and known position, the sensor data being forwarded to gateway 112 may be further appended to include additional information, such as the ID of the concentrator 108, allowing gateway 112 to determine the approximate originating location of tag 104. In alternative embodiments, gateway 112 may determine the approximate originating location of tag 104 based on the originating concentrator 108 from which the data was sent without requiring any appending of the sensor data.

When data is sent from gateway 112 to tag 104, gateway 112 may send data to concentrator 108, which may then be encrypted and encoded into a format to be sent over BLE to tag 104. Data that is sent from gateway 112 to tag 104 via concentrator 108 may include confirmation of the receipt of data received previously from tags 104.

The person skilled in the art will now recognize that various forms of computer-readable programming instructions stored in memory 812 can be executed by processor 808 as applications or queries.

Memory 812 may further include payload encoding 816. As previously indicated, advertising packets that are received by concentrator 108 from tags 104 may require decoding and decryption. In addition, data that is received by concentrator 108 from gateway 112 may require encoding and encrypting into advertising packets to be sent to tag 104. As previously stated, the conversion in data format to and from advertising packets by concentrator 108 is to accommodate that BLE format of communication between concentrator 108 and tags 104. Payload encoding 816 performs the conversion, including the decoding and decrypting of sensor data, and also the encoding and encrypting of confirmation of receipt messages from gateway 112 into advertising packets.

Furthermore, the decoding and decryption of advertising packets and the encoding and encryption of advertising packets are used to modify configuration fields prior to relaying data to their destination. For example, as tags 104 and concentrators 108 communicate with each other in beacon mode, the timing and time slots of each component sending and receiving needs to be coordinated to ensure data is received. As such, advertising packets may be updated or modified with a system clock time stamp to ensure that tags 104 and concentrators 108 have their system clocks in sync. The timing of sending and receiving will be further discussed below.

Memory 812 further includes concentrator time slot manager 820. In the alternative, the memory may include instructions to execute concentrator time slot manager 820. Concentrator time slot manager 820 manages the time division multiplexing scheme that allows for the managing of time slots for communication between concentrator 108 and tags 104. More specifically, there is an allocated period of time, also referred to herein as a time slot, upon which concentrator 108 may be used to communicate with specific tags 104. For example, a first time slot may be allocated to communicate with a first tag 104, and a second time slot may be allocated to communicate with a second tag 104. Concentrator time slot manager 820 manages the time slots and allocates the time slots to specific tags 104. In addition, concentrator time slot manager 820 also manages other time slots for other purposes, such as the discovery of new tags 104 that are introduced into the range of concentrator 108. Details regarding time slots will be discussed further below.

Concentrator 108 also includes communication interface 804 interconnected with processor 808. Communication interface 804 includes suitable hardware (e.g. transmitters, receivers, network interface controllers and the like) allowing concentrator 108 to communicate with other devices, such as tag 104 and gateway 112. In the current embodiment, communication interface 804 may include hardware capable of transmissions using BLE 4.0 or newer versions or standards of BLE to communicate with tags 104. More specifically, communication interface 804 may have a link over BLE between each tag 104 for the transmission of data.

Communication interface 804 may also include a wired serial link to transmit data between concentrator 108 and gateway 112. In alternate embodiments where it may be infeasible or difficult to provide a wired serial link such as open air environments or environments with substantial traffic, communication interface 804 may also include a wireless link to transmit data between concentrator 108 and gateway 112. The person skilled in the art will recognize that communication interface 804 may contain any suitable hardware for wireless communication with tags 104, and both wireless and wired communication with gateway 112.

Returning to FIG. 1, gateway 112 is connected to concentrator 108 and receives data relayed from tags 104 via concentrator 108. In the current embodiment, gateway 112 is also connected to WAN 120, however in other embodiments, gateway 112 may be connected to other computing systems, such as site manager 116. Other potential embodiments, some of which involve site manager 116, will be further discussed below.

Figure 9:
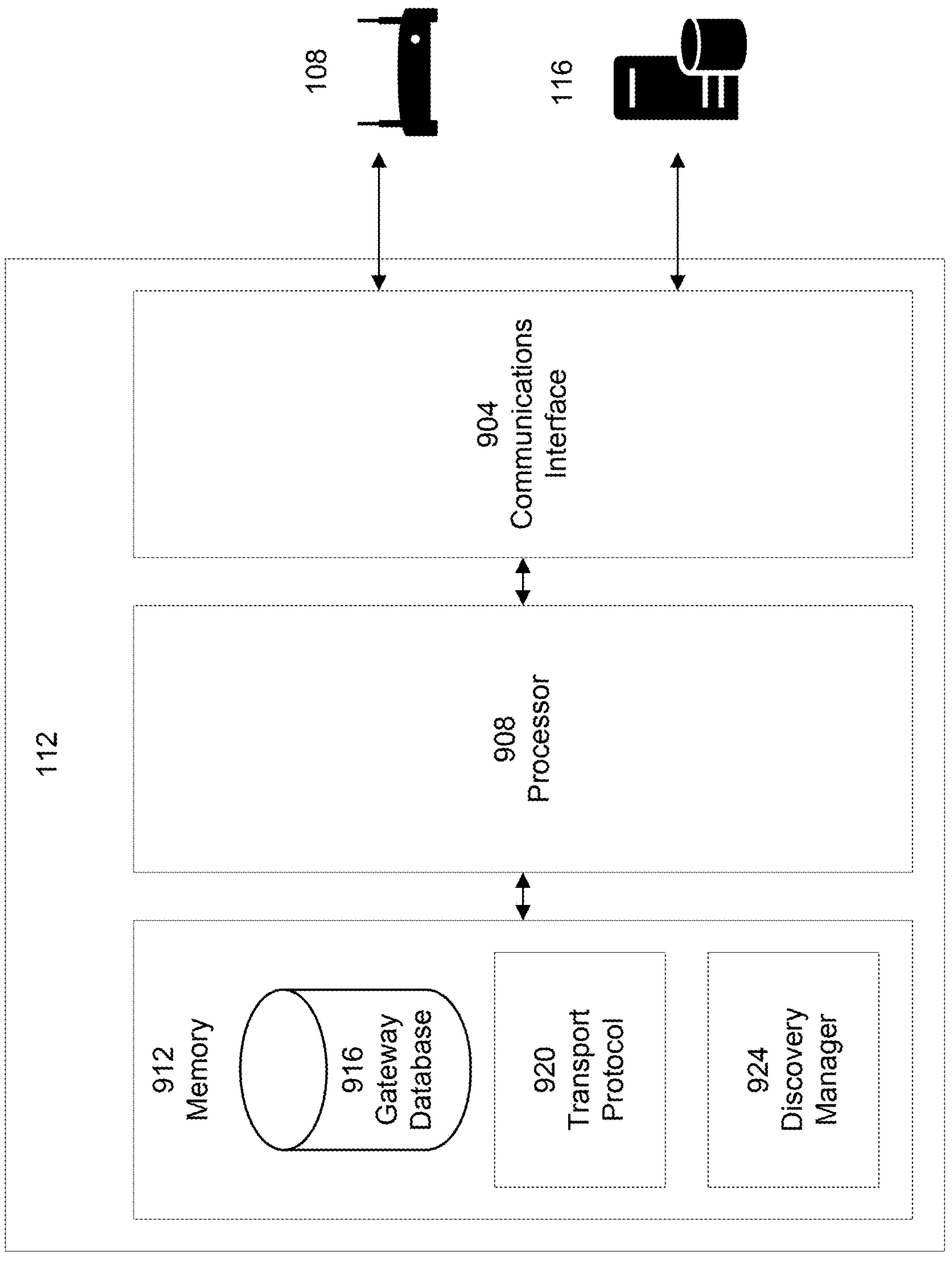
FIG. 9 depicts an example gateway, where the gateway includes a communication interface, a processor, and a memory, the memory including a gateway database, a transport protocol application, and a discovery manager.

Referring to FIG. 9, gateway 112 includes processor 908 interconnecting memory 912 and communication interface 904. Similar to processor 708 of tag 104 and processor 808 of concentrator 108, processor 908 can include a central-processing unit (CPU), a microcontroller, a microprocessor, a processing core, a field programmable gate array (FPGA), or similar. Processor 908 may also include multiple cooperating processors. Processor 908 may also cooperate with non-transitory computer readable medium such as memory 912 to execute instructions to realize the functionality discussed below.

Memory 912 can include a combination of volatile (e.g. Random Access Memory or RAM) and non-volatile memory (e.g. non-volatile random access memory, read only memory or ROM, Electrically Erasable Programmable Read Only memory or EEPROM, flash memory). All or some of memory 912 can be integrated with processor 908. Memory 912 stores computer readable instructions for execution by processor 908.

Similar to memory 812, memory 912 stores a plurality of computer-readable data and programming instructions, accessible by processor 908, in the form of software objects, such as applications, queries or types of data for use during the execution of those applications. In particular, the execution of instructions in memory 912 by processor 908 include performing an output action, such as the recording of data received from tags 104, as relayed by concentrator 108 into database 916. Memory 912 may also include instructions for processor 908 to send confirmation of receipt of sensor data to concentrator 108 to be relayed back to the individual tags 104, where the data originated.

Figure 25:
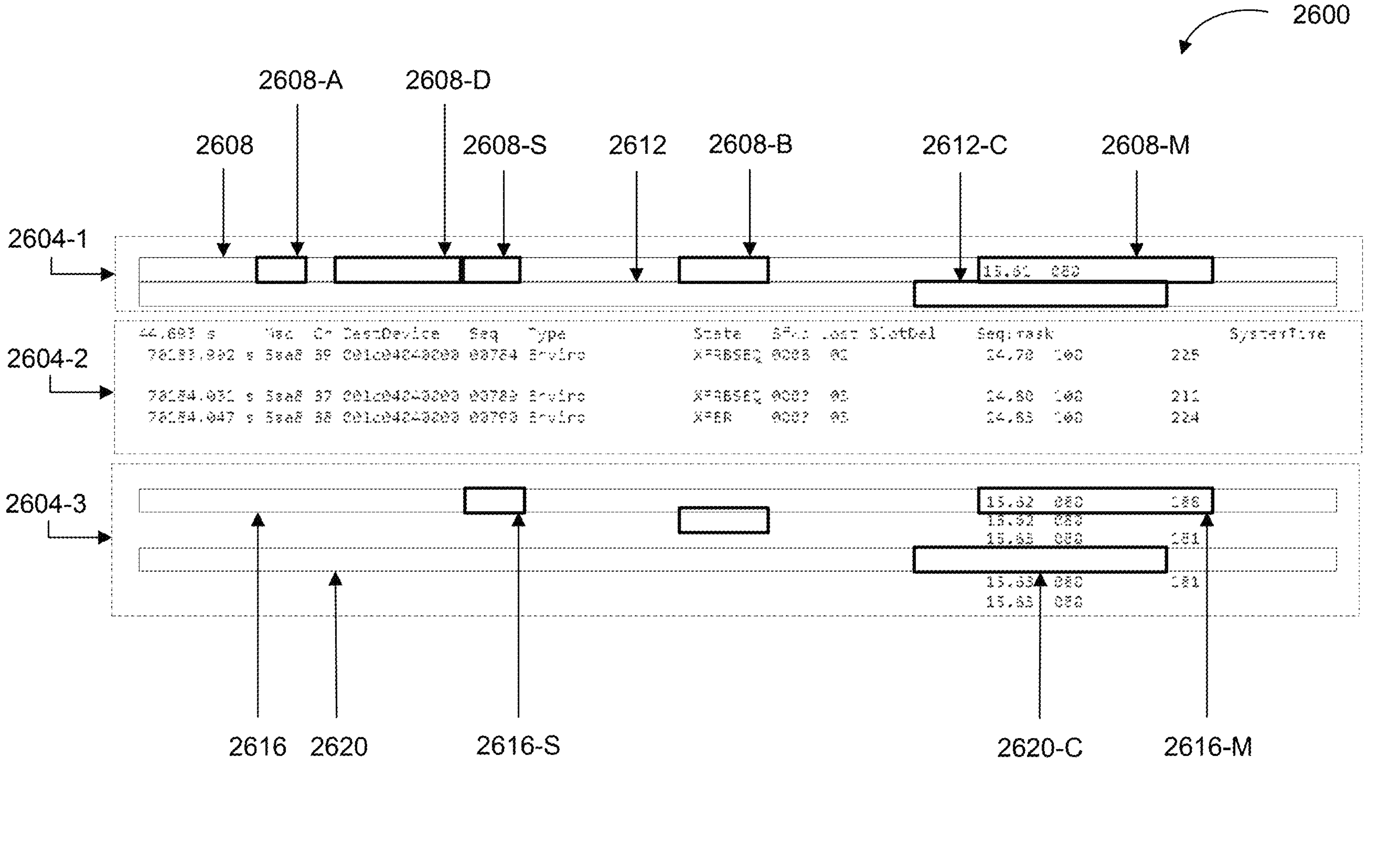
FIG. 25 depicts a screenshot of the advertising packets being sent within different time slots.

For example, a single tag 104 may generate advertising packets from sensor data, where the advertising packets includes the unique tag ID associated with tag 104, and a unique advertising packet ID. Each advertising packet includes a single sensor data reading from each sensor 716. For example, an advertising packet includes the unique tag ID, the unique advertising packet ID, and may include a single reading from the temperature sensor, and a single reading from the humidity sensor. An example advertising packet is depicted in FIG. 25 as advertising packet 2608, where unique tag ID 2608-A, unique advertising packet ID 2608-S and sensor data 2608-M can be seen, where the values of 15.61, 080, 048 and 191 each depict a unitless reading from a sensor 716. For example, the value of 15.61 may reference a temperature of 15.61° C. The structure and values of the advertising packet will be further discussed below. Returning to FIG. 9, tag 104 may then send the advertising packets to concentrator 108. The advertising packets are then decoded and decrypted at concentrator 108, and the decoded and decrypted sensor data, unique tag ID and advertising packet ID are relayed to gateway 112. Upon receipt of the sensor data, processor 908 may log the receipt of the sensor data in database 916 (an output action), along with the unique tag ID specific to the originating tag 104 and the advertising packet ID that the sensor data was received from, and a time stamp. Gateway 112 may then generate a confirmation of receipt of the advertising packet IDs received. More specifically, a 16 bit mask is generated depicting which advertising packet IDs were received and which advertising packet IDs were not received. Gateway 112 is able to determine which advertising packet IDs were not received due to the sequential nature of advertising packet IDs. The structure of the confirmation of receipt, the 16 bit mask and the process of determining advertising packet IDs that were not received will be further discussed below. Confirmation of receipt of the sensor data by gateway 112 may then be sent to concentrator 108, where concentrator 108 will convert the confirmation of receipt into an advertising packet to be broadcast to be received by. The person skilled in the art will recognize that various forms of computer-readable programming instructions stored in memory 912 can be executed by processor 908 as applications or queries.

As previously indicated, memory 912 may include database 916. Database 916 includes a log of sensor data for tags 104, and the time stamp of receipt of the sensor data. This allows for a log of all tags 104 that were within the network of gateway 112 for further data processing by other systems and will be discussed further below. Database 916 may also hold logs for tags 104 for a predetermined period of time, upon which time, after the data is sent to data servers 124, the data may be deleted from database 916 for conservation of memory capacity. An example of the data logged may be seen in FIG. 24 as part of log schema 2400. Returning to FIG. 9, memory 912 may further include transport protocol 920. Transport protocol 920 includes instructions for processor 908 for assured data delivery from tag 104 to gateway 112. Assured data delivery of transport protocol 920 ensures that data from tag 104 that may be corrupted, or that may be lost due to various reasons during transfer are resent and delivered and received by gateway 112. As previously described, gateway 112 may generate a confirmation of receipt to be sent back to tags 104 via concentrator 108. The transport protocol 920 is used to help determine the data that has not been received by gateway 112, and to generate the confirmation of receipt in a 16 bit mask to be sent to concentrator 108. Further details of transport protocol 920 and the assured data delivery will be discussed further below.

Memory 912 also includes discovery manager 924. Discovery manager 924 manages the discovery of new tags 104 as they enter the range of concentrator 108. In addition, in other embodiments where there are multiple concentrators 108 within a network, discovery manager 924 also manages the roaming of tags 104 from the coverage area of a first concentrator 108 to the coverage area of a second concentrator 108. Discovery manager 924 further includes data regarding blacklisted tags 104, and whether specific tags 104 may be allowed or not allowed. Further details of discovery manager 924 will be discussed further below.

Gateway 112 also includes communication interface 904 interconnected with processor 908. Communication interface 904 includes suitable hardware (e.g. transmitters, receivers, network interface controllers and the like) allowing gateway 112 to communicate with other computing devices, such as concentrators 108. In other embodiments, gateway 112 may also communicate with site manager 116.

Furthermore in other embodiments, communication interface 904 may be connected to a network, the internet or other databases for information, allowing processor 908 to communicate with other computer devices, or other databases for information, such as data servers 124 and client terminals 128. This will be further discussed below. Specific components of communication interface 904 are selected based on the type of network or other links that processor 908 is required to communicate over.

Returning to FIG. 1, gateway 112, client terminals 128 and data servers 124 are interconnected via a communication network such as WAN 120. The person skilled in the art will recognize that WAN 120 is not limited in its configuration. For example, WAN 120 may be implemented over the Internet, as is in the current embodiment. Any desired levels and types of security and encryption protocols are contemplated and can be implemented over WAN 120.

While in the current embodiment, WAN 120 is used, and more specifically, WAN 120 is implement over the Internet, the person skilled in the art will recognize that other types of communication networks, such as a local-area network, a WiFi™ network, a wireless cellular network, a virtual private network ("VPN"), or a combination of such and similar may be used.

The at least one data server 124 is connected to gateway 112 through WAN 120 and may contain databases of data from gateway 112. It will occur to the person skilled in the art that data servers 124 is not limited to a plurality of data servers 124, but may either be a single data server 124, or may be a plurality of data servers 124. Records from database 916 in gateway 112 may be transmitted to data servers 124 (an output action) to be accessed remotely over the Internet or WAN 120. This provides a continuous record of the environment and the goods as they move between locations in facilities, and/or as they transit between facilities. For example, if tags 104 are attached to agricultural goods, the potential spoiling of the goods as impacted by temperature till their delivery to sellers to consumers may be tracked. As such, data may be logged and saved in data servers 124, allowing for both the monitoring of data from tags 104, and for the querying of past data from tags 104 for data analysis.

Monitoring data from tags 104 allows for reporting and detection of incidents. This data favors an agile supply chain, upon which knowledge of an incident may allow a personnel to act immediately to ensure little to no disruption in the supply chain, or in the delivery to customers. If tags 104 are in transit and out of range of concentrators 108, data accumulated while tag 104 is in transit will be provided upon tags 104 coming into range of concentrators 108, allowing personnel to determine the incident upon arrival of tags 104 into range. For example, if tags 104 are attached to a pallet of eggs for transportation, and tags 104 are configured with sensors 716 to register shocks, or extreme motion, then breakage may be monitored if tags 104 are in range of concentrator 108, or if the pallet of eggs and tag 104 are in transit and outside the range of concentrator 108, then the breakage will be reported as soon as the pallet of eggs and tag 104 reaches its destination and is in range of concentrator 108. The location of the incident will also be reported based on the concentrator 108 that relayed the data to gateway 112. The monitoring of the incident and the reporting of the incident allows for the logging of the incident, and changes to the supply chain to accommodate the breakage.

Thresholds or ranges for sensor data may also be setup, allowing alarms to be triggered in the event that the sensor data surpasses the threshold or exceeds the designated range. In certain embodiments, as previously discussed, alarms may be sent if tag 104 determines that the sensor data gathered surpasses predetermined thresholds or exceeds predetermined ranges. The alarm may then be sent to concentrator 108 to be relayed to gateway 112, where it may be sent to be displayed on client terminal 124 via WAN 120. The predetermined thresholds and ranges may be set through configuration parameters and will be further discussed below. In alternative embodiments, thresholds and ranges may be set in data servers 124, concentrator 108, gateway 112 or site manager 116. For example, data server 124 may be configured to compare the received sensor data from tag 104 against the previously set thresholds and ranges, and if the value of the sensor data surpasses the set thresholds or is outside the set ranges, then an alarm may be sent to be displayed on client terminal 124. Concentrator 108, gateway 112 or site manager 116 may perform the same function to determine if the received sensor data is within predetermined thresholds or ranges. In addition, in alternative embodiments, alarms may not be sent to client terminal 128, but may be sent to any external device, such as an external server at a central monitoring location (not depicted), with access to WAN 120 that may best alert users to the sensor data surpassing a threshold or exceeding a range. For example, an alarm of temperature exceeding a threshold for temperature sensitive goods may be sent to an external server at a central monitoring location, where a team of personnel may coordinate and direct personnel closer to tag 104 to investigate. Alarms may also be sent and displayed via a variety of methods, such as being sent and displayed on a user interface, or being sent as a message over SMS. The person skilled in the art will recognize the different configurations for setting thresholds and ranges for alarms, including the different devices that may be used for determining if sensor data surpasses a threshold or exceeds a range, the destination of the alarm, and the appearance and sending method for the alarm.

Historical records or logs from database 916 or from data server 124 may also be queried to provide data from multiple gateways 112 to determine potential correlations between data. This allows for determination of trouble spots. For example, if assets that have tags 104 on them are routinely providing with higher temperatures in the locations associated with specific concentrators 108, querying the collected data on data server 124 over a lengthened period of time and querying collected data in other locations may provide additional insight as to whether there are environmental conditions affecting the assets with tags 104. This may lead to the discovery of an issue affecting the environmental conditions in specific locations, or may lead to the discovery of a trouble spot, at which time the previously discussed monitoring may be engaged for the trouble spot, allowing for quicker reaction time to fix issues, or to potentially witness the issue as it occurs. Determination of trouble spots through querying data may occur on data server 124, gateway 112, or site manager 116. For example, the processor on data server 124 may query its own databases for sensor data, and analyze the data to determine a trouble spot. In alternate embodiments, determination of trouble spots may also occur on client terminal 128 or on other external servers (not depicted) connected to WAN 120. For example, client terminal 128 may query data server 124 for records of sensor data, and the records of sensor data may be returned to client terminal 128, where an analysis of the records of sensor data may occur locally on client terminal 128. The person skilled in the art will recognize the different configurations available for the determination of trouble spots, analysing sensor data, and the monitoring of sensor data. Trends may also be discovered through querying logs from data server 124, allowing for the discovery of areas of optimization.

Client terminals 128 are connected to data servers 124 and gateway 112 through WAN 120. Client terminal 128 may act as a user input terminal to access information on gateway 112 and data servers 124. Users may access the data and run queries on the data. Alternatively, client terminals 128 may be used to access gateway 112 and data servers 124 for maintenance purposes. Client terminal 128 can be a computer device such as, but not limited to, a desktop computer, a laptop computer, another server, a kiosk, a cell phone, a tablet, a mobile device, a monitor or other suitable device.

Figure 2:
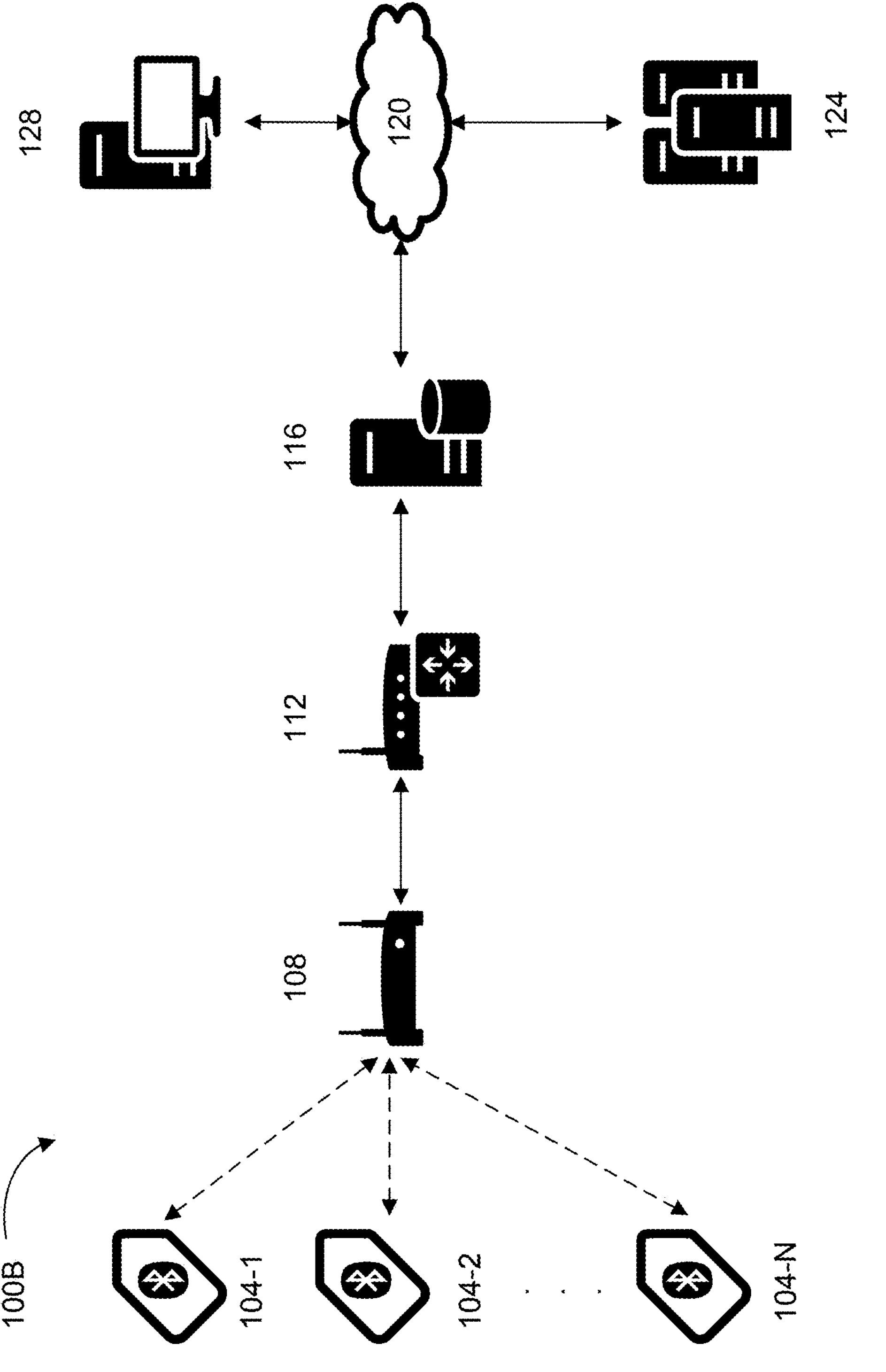
FIG. 2 depicts an alternate system for the tracking and gathering of sensor data from tags attachable to assets, where a site manager is included in the system.

System 100 as depicted in FIG. 1 is an embodiment of the logistical tracking network in its simplest configuration. FIG. 2 depicts system 100B, another embodiment of the logistical tracking network, in which site manager 116 is included. Site manager 116 may be interconnected between gateway 112 and WAN 120.

Site manager 116 may be a computer terminal, or may be a server depending on the hardware and processing requirements and the size of the facility or site that site manager 116 is associated to. Site manager 116 may contain a database upon which data received by gateway 112 is logged prior to forwarding the data to database server 124. In system 100B, site manager 116 may contain the same data that is available in database server 124, however in embodiments described below where there may be more than one location with a logistical network, site manager 116 allows for a local copy of data to be stored across multiple gateways 112. Furthermore, site manager 116 may provide additional processing power for the query, manipulation and analysis of data. By having site manager 116, the processer load for performing such functions may be reallocated from gateway 112 to site manager 116, freeing up processing power for gateway 112 to perform other tasks, and minimizing latency for communication with concentrator 108 and tags 104. Alternatively, by reallocating processing load to site manager 116, the hardware and processor requirements may be lower for gateway 112, lowering the cost of hardware.

Site manager 116 further provides an on-site backup. In the event that access to WAN 120 is unreliable, or if the connection to data servers 124 is unreliable, data may be accessed via site manager 116. This may be used for operations that require continuous monitoring or have strict regulations regarding logging of data. In addition, site manager 116 also provides ease of access to data locally, allowing the customization and generation of custom reports, such as generation of inventory reports, pick lists, or bill of ladings.

Figure 3:
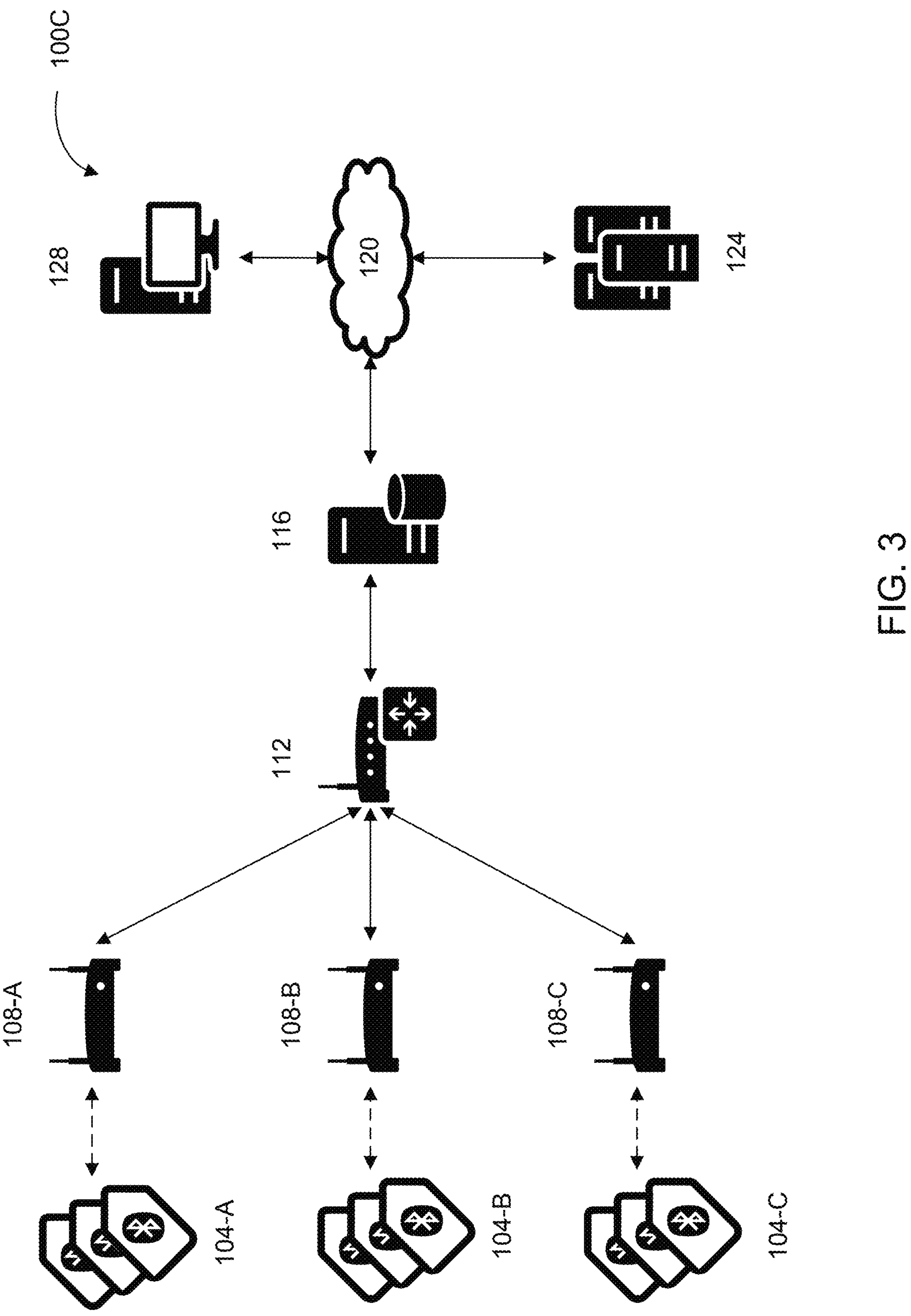
FIG. 3 depicts an alternate system for the tracking and gathering of sensor data from tags attachable to assets, where there are multiple concentrators included in the system.

FIG. 3 depicts system 100C, another embodiment of the logistical tracking network where multiple tags 104 may be connected to their respective concentrators 108. More specifically, a plurality of tags 104-A may be in range to be wirelessly connected to concentrator 108-A, a second plurality of tags 104-B may be in range to be wirelessly connected to concentrator 108-B, and a third plurality of tags 104-C may be in range to be wirelessly connected to concentrator 108-C. Concentrators 108-A, 108-B and 108-C may then relay data to gateway 112. As can be seen, in this embodiment, more than one concentrator 108 may be connected to gateway 112, and the number of concentrators 108 connected to gateway 112 is scalable.

Figure 4:
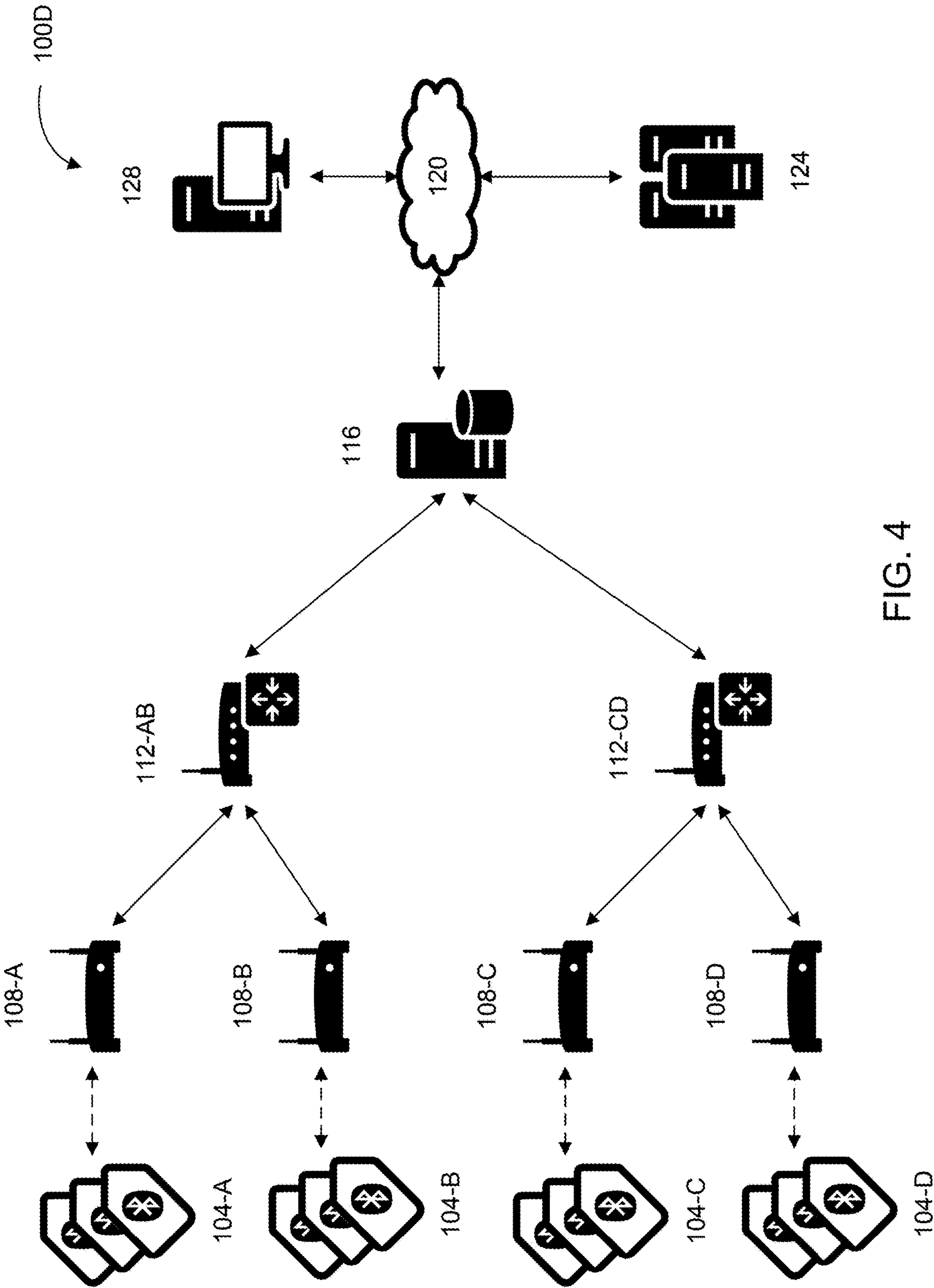
FIG. 4 depicts an alternate system for the tracking and gathering of sensor data from tags attachable to assets, where the system includes multiple concentrators connected to multiple gateways in a hierarchical manner.

FIG. 4 depicts system 100D, another embodiment of the logistical tracking network where multiple gateways 112 may be present for each site manager 116. For example, a plurality of tags 104-A may be in range to be wirelessly connected to concentrator 108-A, and a second plurality of tags 104-B may be wirelessly connected to concentrator 108-B. Concentrators 108-A and 108-B may be connected to gateway 112-AB. Similarly, a plurality of tags 104-C may be in range to be wirelessly connected to concentrator 108-C, and a second plurality of tags 104-D may be wirelessly connected to concentrator 108-D. Concentrators 108-C and 108-D may be connected to gateway 112-CD. Gateways 112-AB and 112-CD may connected to site manager 116. An example of this would be if assets were being tracked and monitored at a large facility, but in two different locations within the large facility, each location having their own gateway 112, but connecting to a single site manager 116 to collate data regarding tags 104 in the facility. The person skilled in the art will recognize that multiple gateways 112 may be connected to site manager 116 and that the number of gateways 112 associated with a site manager 116 is scalable.

Figure 5:
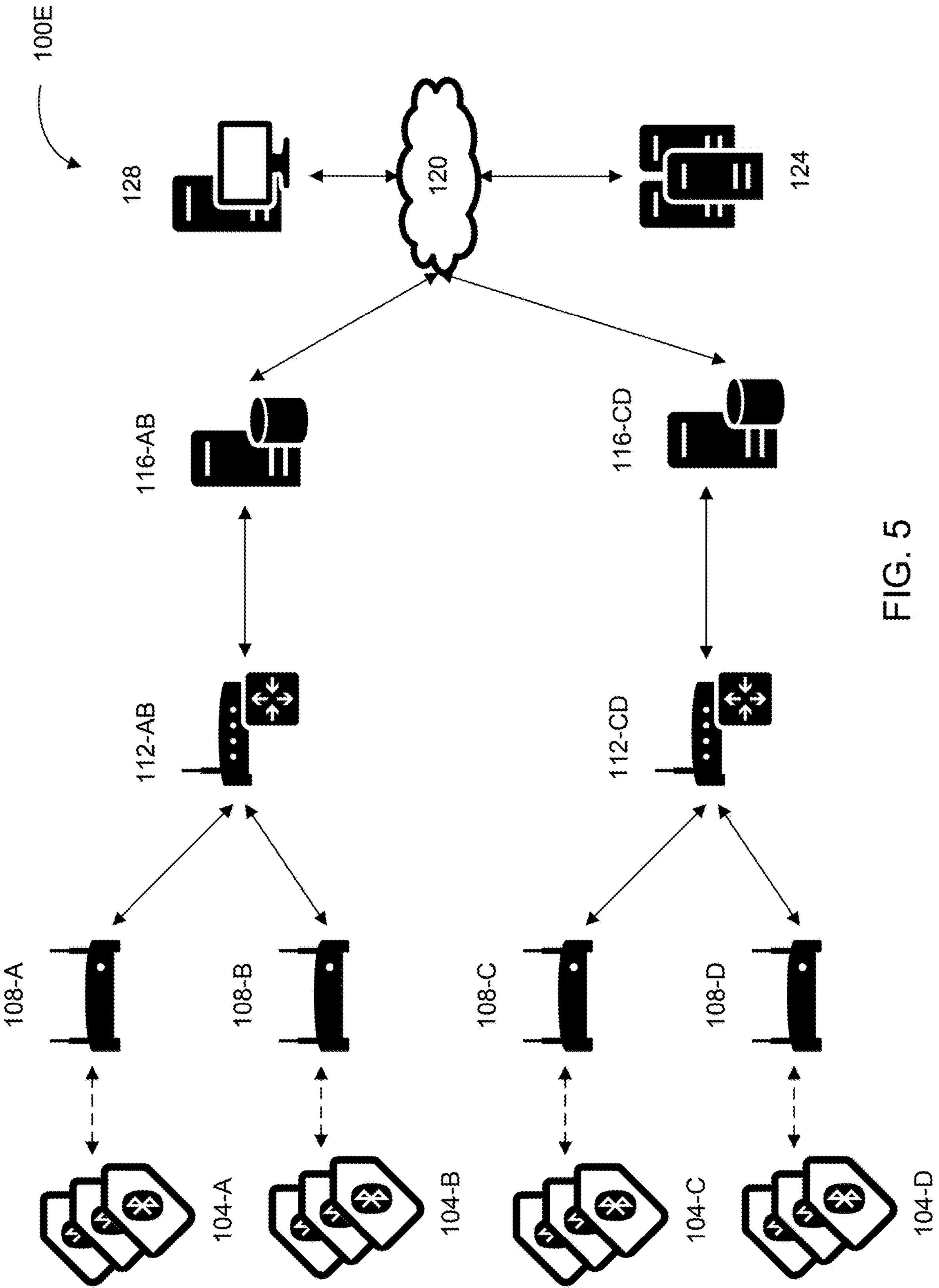
FIG. 5 depicts an alternate system for the tracking and gathering of sensor data from tags attachable to assets, where the system includes multiple concentrators connected to multiple gateways and their own respective site managers in a hierarchical manner.

FIG. 5 depicts system 100E, another embodiment of the logistical tracking network where multiple site managers 116 may be present. Each site manager 116 is connected to WAN 120. Similar to previously described embodiments, multiple tags 104 may be wirelessly connected to concentrators 108. Concentrators 108 are then connected to their respective gateways 112, which are then connected to their respective site managers 116. For example, gateway 112-AB may be connected to site manager 116-AB, and gateway 112-CD may be connected to site manager 116-CD. Both site managers 116-AB and 116-CD may be connected to WAN 120. In this example, there my be two facilities or two locations that are located away from each other, and may be designated as two different sites. The person skilled in the art will recognize that multiple site managers 116 may be used in the logistical tracking network, and may be scalable according to the size of the needs of the logistical tracking network.

Figure 6:
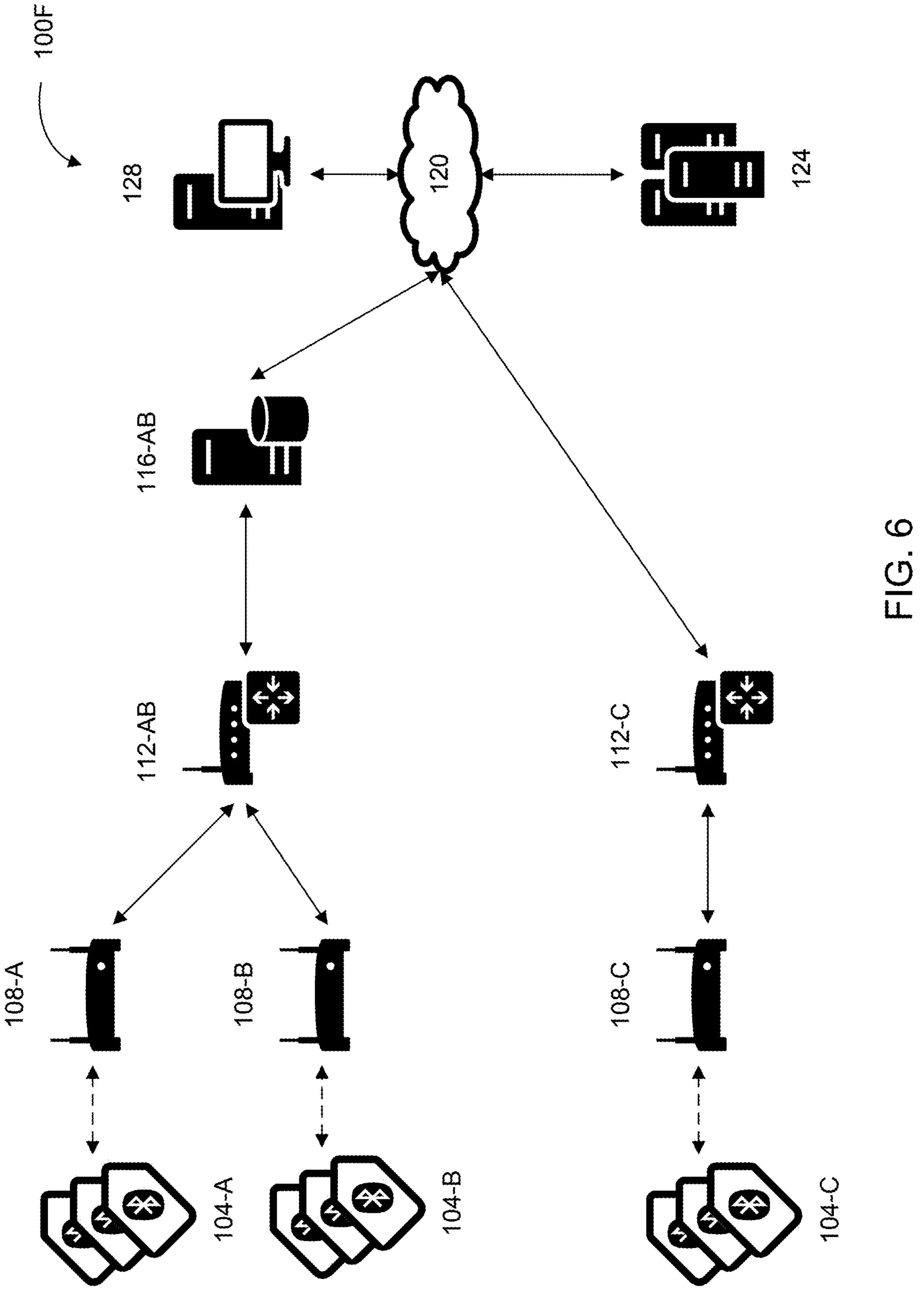
FIG. 6 depicts an alternate system for the tracking and gathering of sensor data from tags attachable to assets, where the system includes different configurations of concentrators, gateways and site managers in a hierarchical manner.

FIG. 6 depicts system 100F, another embodiment of the logistical tracking network where a combination of different variations of tags 104, concentrators 108, gateways 112 and site managers 116 are used. More specifically, a plurality of tags 104-A are wirelessly connected to concentrator 108-A, and a second plurality of tags 104-B are connected to concentrator 108-B. Concentrators 108-A and 108-B are connected to gateway 112-AB, which may be connected to site manager 116-AB. Tags 104-C may be at a different location wirelessly connected to concentrator 108-C, and concentrator 108-C may be connected to gateway 112-C. In this example, as tags 104-C, concentrator 108-C and gateway 112-C may be logistically simplistic, a site manager 116 at this location may not be needed, and as such, gateway 112-C may be connected to WAN 120. The person skilled in the art will not only recognize the scalability of the logistical network, but the modularity of the components when expanding or reducing the size of the logistical network.

Based on the above embodiments, it should occur to the person skilled in the art that concentrators 108 are placed in locations where tags 104 are to be wirelessly detected and concentrators 108 have a range upon which tags 104 are wirelessly detected and connected to. In the current embodiment, gateways 112 are connected to concentrators 108 via a local area network through cables, and as such gateways 112 are located in areas surrounding concentrators 108. Site managers 116 are preferably located at the same site upon which multiple locations within the same site are located. For example, a site may be a factory with multiple locations for tag 104 detection, such as shipping and receiving, or a production line. Data servers 124 and client terminals 128 are not limited to being on the same site.

It should also occur to the person skilled in the art that in addition to the components that are located at a site being scalable within a logistical tracking network, various combinations of components and placements for each component within the logistical tracking network are possible depending on variables of the logistical tracking network. More specifically, the person skilled in the art will recognize that concentrators 108, gateways 112 and site managers 116 are located in the areas where tags 104 are to be detected and wirelessly connected to concentrators 108, and may be placed in different configurations based on the size of the logistical tracking network, the size of the locations and/or sites upon which the concentrators 108, gateways 112 and site managers 116 of the logistical tracking network are to cover, the number of locations the logistical tracking network is to cover and the environmental conditions of the locations.

Figure 10:
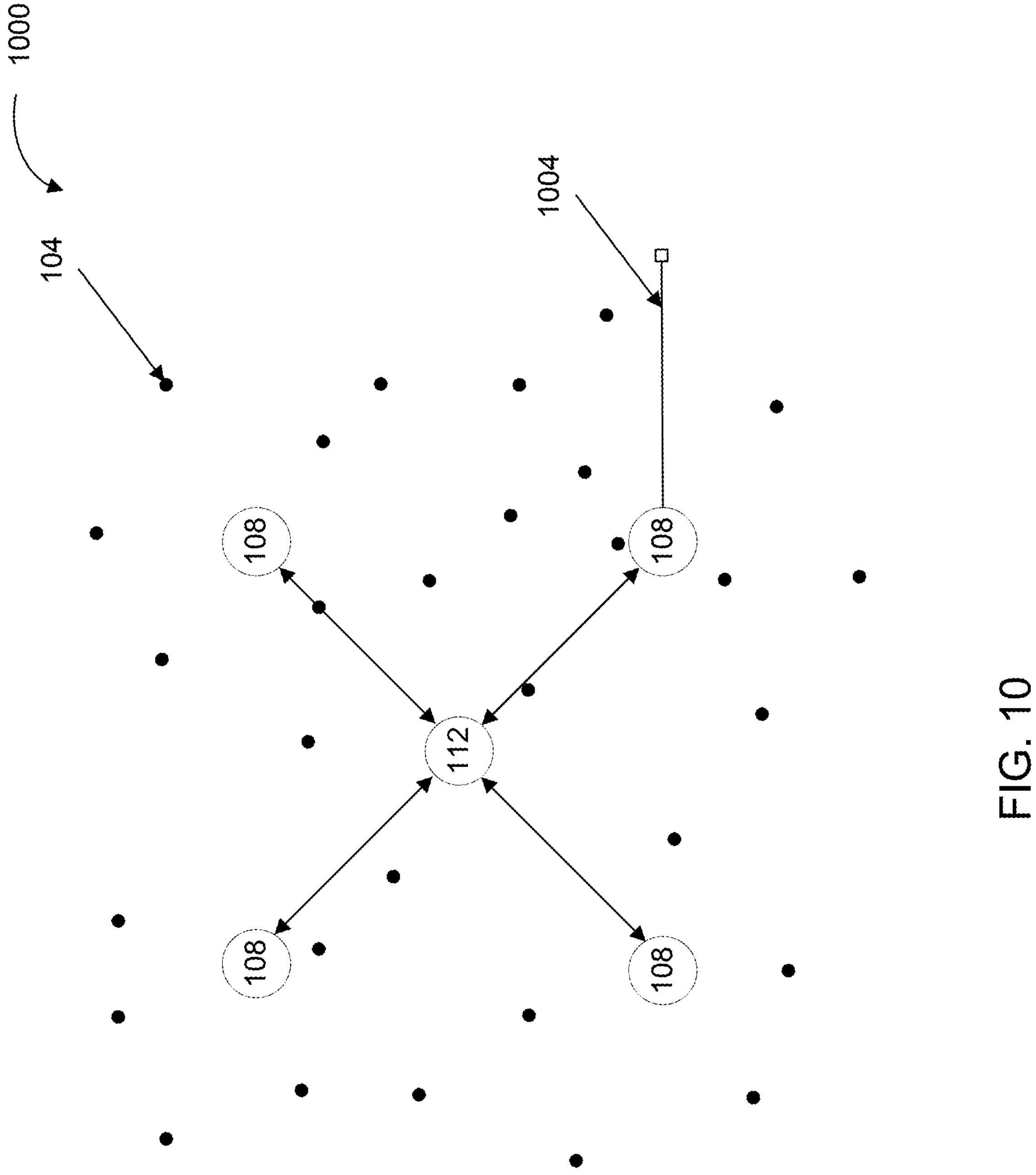
FIG. 10 depicts an example top view of a schematic layout of concentrators and gateways in an area.

Referring to FIG. 10, configuration 1000 depicts a top-down view of a standard configuration of four concentrators 108 connected to gateway 112 and the resulting wireless BLE coverage. As can be seen, concentrators 108 use a "star network" approach. While the configuration of concentrators 108 and gateways 112 are not limited to a star network approach, in at least some embodiments, the star network approach is chosen over a mesh network approach as mesh networks use optimization algorithms in the maintenance of mesh networks, and while this may reduce the overall data volumes between tags 104, there is an increased battery cost. A star network approach uses less battery life in tags 104, allowing for less maintenance and allowing for tags 104 to have longer lifespans. A mesh network also needs to be stable. Any change in configuration or topology caused by concentrators 108 being moved, or tags 104 being added or removed requires a stabilization period. A star network approach allows for lower latency during the movement of tags 104.

In the current embodiment, configuration 1000 also uses a hierarchical network architecture, where gateway 112 controls each of concentrators 108, allowing the managing of tags 104 in a deterministic manner, and hence reducing the latency to a minimum when tags 104 move between concentrators 108. In addition, a hierarchical network approach, as is in configuration 1000, has a decreased volume of advertising packets moving between tags 104 and concentrators 108 in comparison to a mesh network. In a mesh network, advertising packets may need to move between tags 104 before reaching concentrator 108, increasing the volume of advertising packets that tags 104 have to process. However, in alternative embodiments, a mesh network may be used if additional coverage area, or a reduction in overall data volumes is required. The type of network to be used may be selected based on the requirements of a facility and its network. The person skilled in the art will recognize the different configurations and network arrangements that may be used. In addition, concentrators 108 have an approximate circular coverage with radius 1004. Tags 104 that are within this coverage are detected and may connect to concentrators 108. More specifically, tags 104 that are within the coverage of a single concentrator 108 are detected and connect to said concentrator 108. Tags 104 that are within the overlapping coverage area of more than one concentrator 108 may connect to a single concentrator 108 based on the first concentrator 108 in range, and may move to a second concentrator 108 based on a predetermined number of advertising packets that are not received by the first concentrator 108. Movement of tag 104 and the discovery of tags 104 as they enter the coverage area of concentrators 108 will be discussed further below.

Furthermore, in at least some embodiments, configuration 1000 is the preferred choice for receiving maximum tag 104 density with respect to the operations of concentrator 108. In addition, if tag 104 density were to be reduced to half, there is enough bandwidth, memory and processing power to provide 100% redundancy in the coverage.

Figure 11:
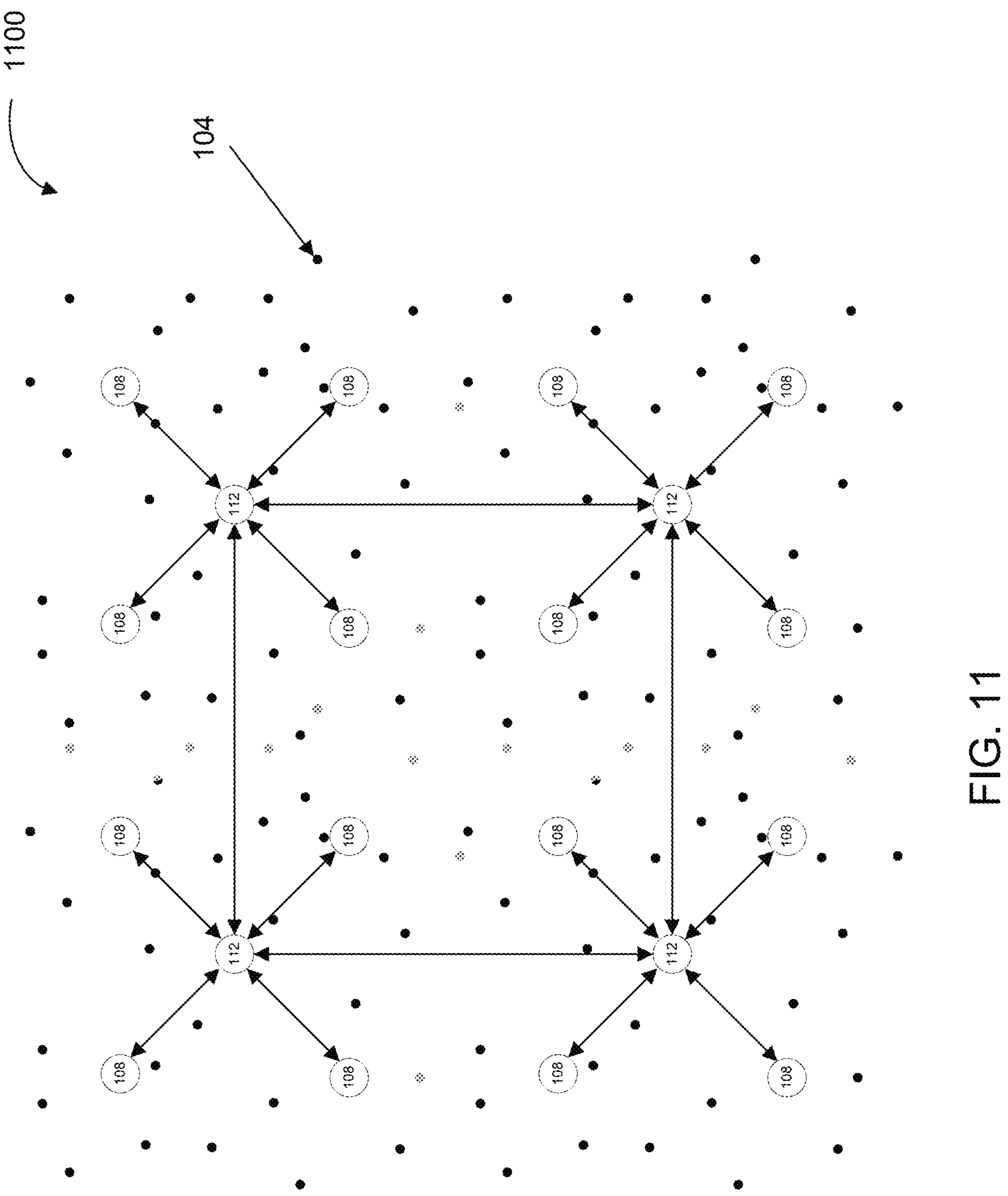
FIG. 11 depicts an example top view of a schematic layout of sixteen concentrators and four gateways in an area, where each gateway has four concentrators.

Referring to FIG. 11, configuration 1100 depicts a top-down view of a configuration of concentrators 108 connected to gateways 112 for a larger logistical tracking network. As previously mentioned, one variable that will affect the configuration of the logistical tracking network is the size of the logistical network. If the size of the logistical network is large or if the tag density is expected to be high, or a large number of tags 104 are being used to track and gather sensor data on assets, then additional concentrators 108, and gateways 112 may be required to ensure there is sufficient memory and processing power to gather all the data. Additional concentrators 108 and gateways 112 may also increase the available bandwidth to transmit data between each other within the logistical tracking network, and increase the coverage range for tags 104. In addition, while not depicted, larger logistical tracking networks may also include additional site managers 116 for the same reasons above.

Configuration 1100 also depicts a scenario where a size of a location affects the variations and combinations of concentrators 108 and gateways 112. If the location upon which the tags 104 are located is spread out over a large area, then a larger number of concentrators 108 may be needed to ensure proper wireless coverage of the area. For example, if a large warehouse needs to be covered, then multiple concentrators 108 may be needed. This leads to an increased number of gateways 112 and potentially site managers 116 (not depicted), if any, to receive the data from concentrators 108. The person skilled in the art will recognize the potential different variations for the placement of concentrators 108, gateways 112 and site managers 116 available for a location and its association with the variables of size of location and size of logistical tracking network.

Figure 12:
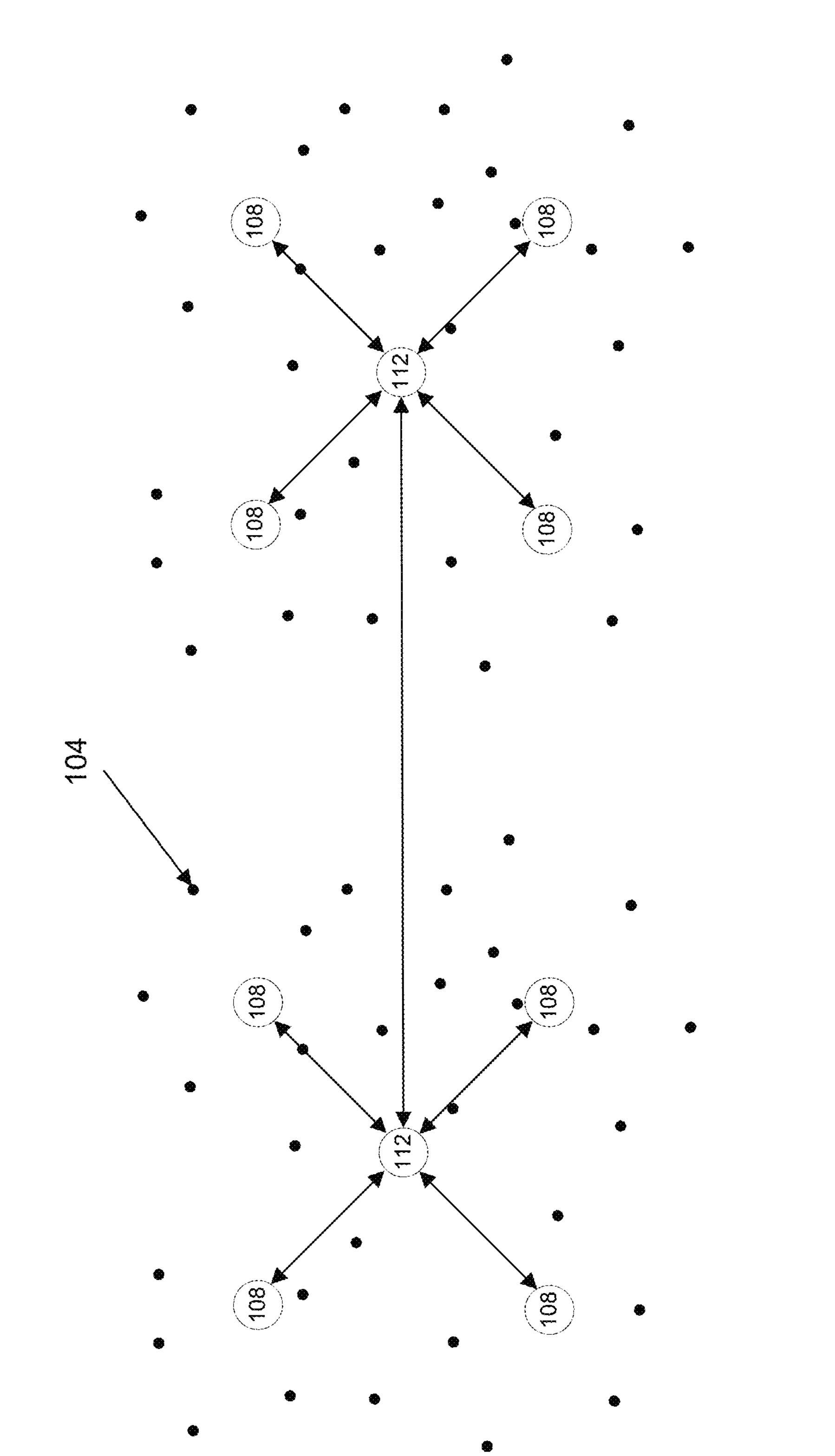
FIG. 12 depicts an example top view of a schematic layout of two gateways in two separate areas, where each gateway is connected to four concentrators.

The number of locations may also affect the variations and combinations of concentrators 108, gateways 112 and site managers 116. FIG. 12 depicts configuration 1200 which depicts a top down view of two separate locations of coverage for tags 104. As can be seen, there are two gateways 112, each with its own subset of four concentrators 108, where each subset of four concentrators 108 provides coverage for a respective location. This configuration 1200 is similar to the example provided above, where a site may be a factory with multiple locations for tag 104 detection, such as shipping and receiving, or a production line. One subset of the four concentrators 108 and its corresponding gateway 112 may be covering the area for shipping and receiving, while the second subset of the four concentrators 108 and its corresponding gateway 112 may be covering the production line. The person skilled in the art will recognize the variations and combinations for the placement of concentrators 108, gateways 112 and site managers 116 associated with the number of locations to be covered by concentrators 108.

Figure 13:
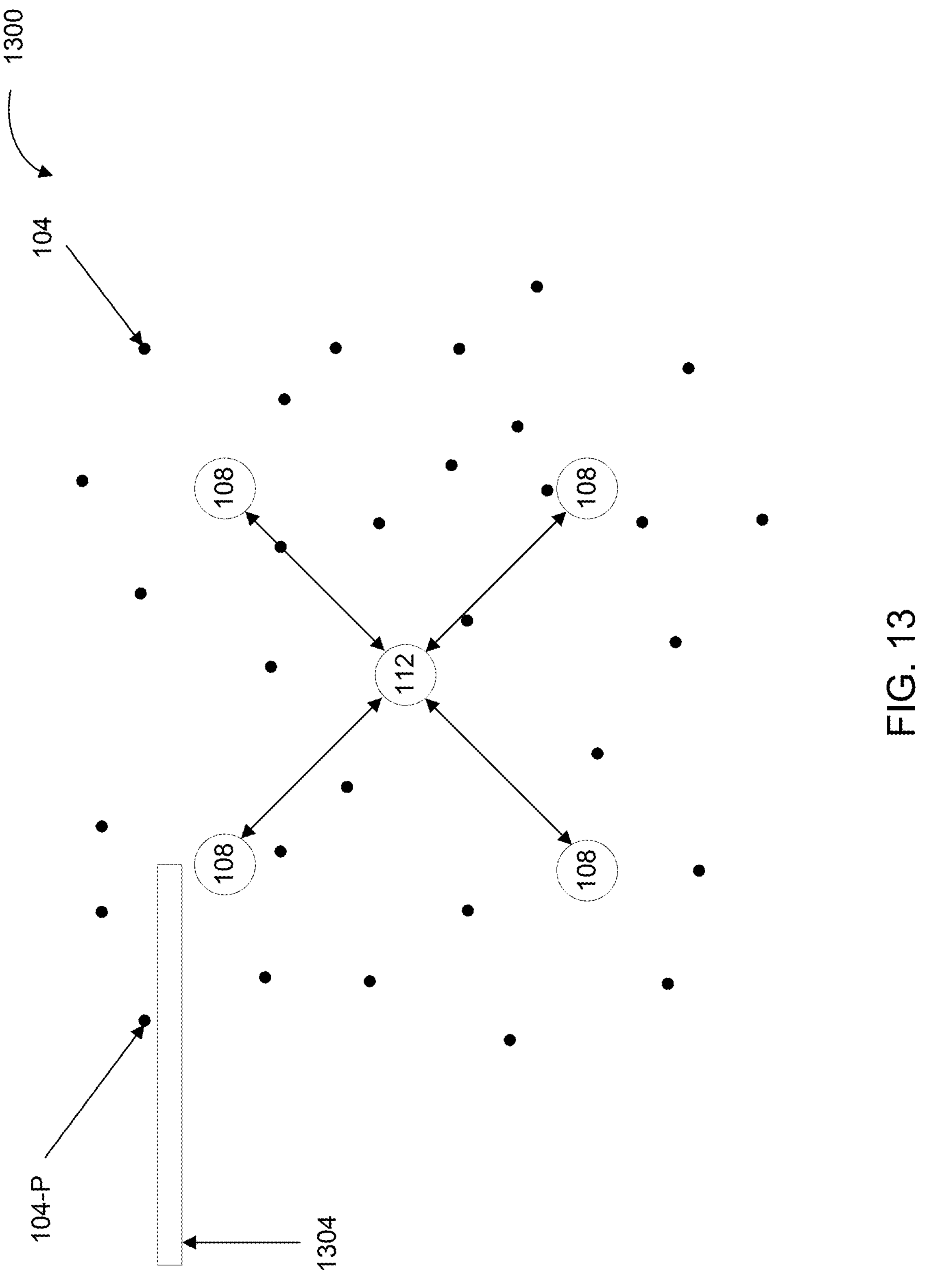
FIG. 13 depicts an example top view of a schematic layout of a gateway and four concentrators, when one of the concentrators has limited range and coverage due to an obstacle.

The environmental conditions of the area to be covered by concentrators 108 may also affect the variations and combinations of concentrators 108, gateways 112 and site managers 116, if any. FIG. 13 depicts configuration 1300, which depicts a top down view of the standard configuration with four concentrators 108 and a gateway 112 and an obstacle 1304. Obstacle 1304 may be any object that may interfere with the coverage range of concentrator 108, or more specifically in the current embodiment an object that blocks BLE. As can be seen, tag 104-P is out of range of concentrator 108. In this embodiment, if coverage is needed past obstacle 1304, additional concentrators 108 and gateways 112 may be needed and placed on the other side of obstacle 1304. Obstacles 1304 may also be temporary in other embodiments. For example, obstacle 1304 may be a forklift, which may temporarily interfere with the coverage range of concentrator 108. In areas of high traffic, there may be many temporary obstacles 1304. The person skilled in the art will recognize the potential placements of concentrators 108 and gateways 112 to provide optimal coverage of a location.

Figure 15:
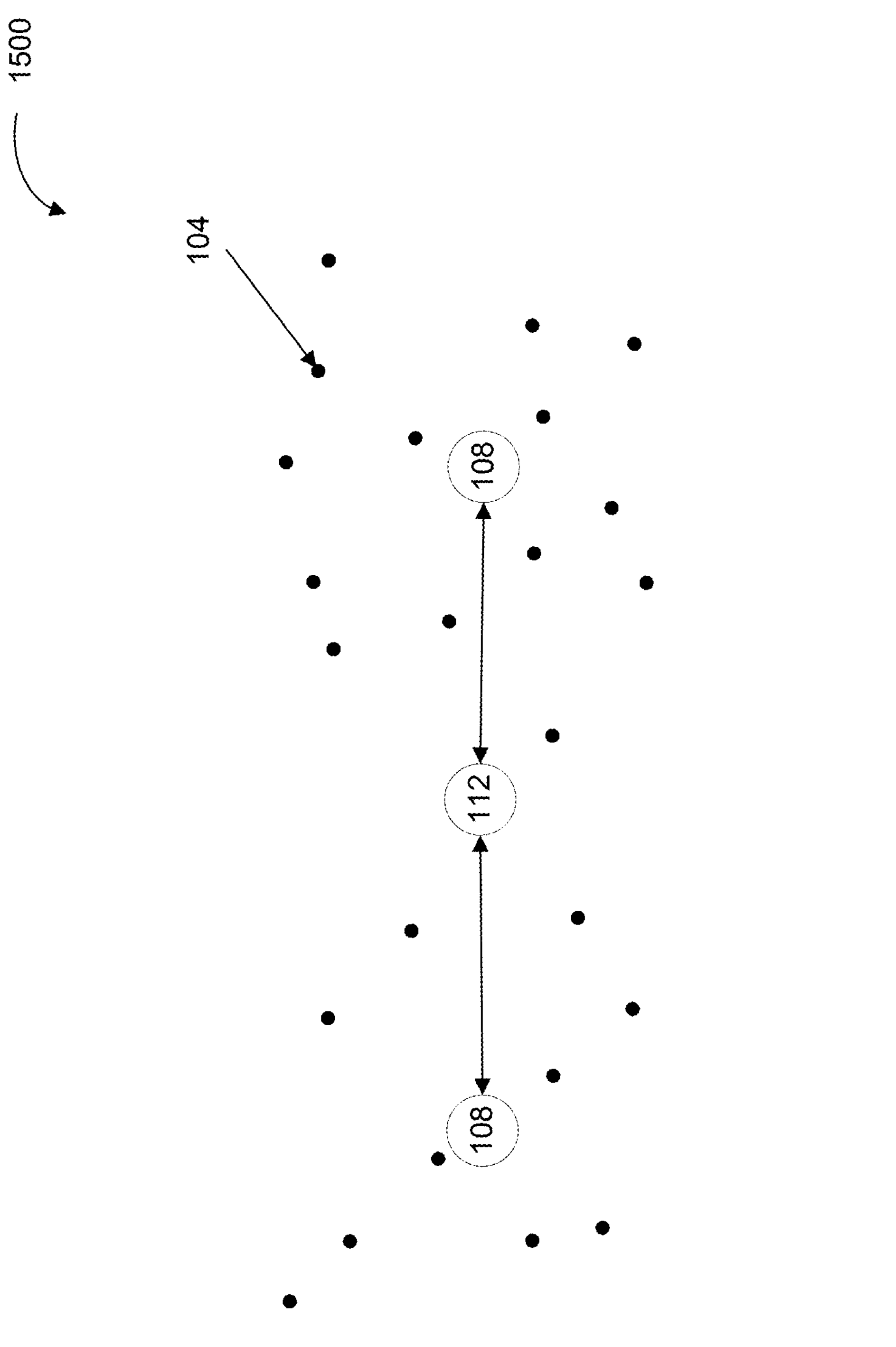
FIG. 15 depicts an example top view of a schematic layout of a gateway and two concentrators, where the two concentrators do not have any overlap in coverage and range.

In the examples provided in FIGS. 10-13, each gateway 112 is connected to a subset of four concentrators 108. The preferred embodiment is to use a subset of four concentrators 108 for each gateway 112. The advantage of configuration 1000 of FIG. 10 with the four concentrators 108 for each gateway 112 will be discussed further below. However in other embodiments, each gateway 112 may connect to any number of concentrators 108. Referring to FIG. 14, configuration 1400 depicts a top down view of a configuration with three concentrators 108 and a gateway 112. FIG. 15 depicts configuration 1500, which is a top down view of a configuration with two concentrators 108 and a gateway 112. The number of concentrators 108 attached to a gateway 112 may be adjusted based on tag 104 density in the area, and the number of gateways 112 present may also be adjusted based on memory and processing requirements based on the number of tags 104 in the area. In addition, placement of the concentrators 108 is dependent on the location and the coverage required for tags 104. For example, as depicted in FIG. 14, there is an overlap in coverage between concentrators 108, however in FIG. 15, there is a distinct gap in coverage between concentrators 108. A gap in coverage may be more optimal based on where tags 104 may be detected in a location. In addition, while not shown, concentrators 108 are not limited to symmetrical configurations, but may be placed in any configuration for optimal coverage. The person skilled in the art will recognize the scalability of concentrators 108 and gateways 112 and the different possible configurations available. The person skilled in the art will also recognize the different possible configurations for concentrators 108 and gateways 112 to obtain optimal coverage.

Configurations of the logistical tracking network are also scalable based on the tag 104 density with respect to time slicing of the BLE air space. More specifically, a time division multiplexing scheme is managed by the concentrator time slot manager 820 of each concentrator 108 and is used in the communication between tags 104, concentrators 108 and gateway 112 to avoid collisions in transmissions that may reduce the network capacity.

The time division multiplexing scheme includes cycling frames with time slots to perform functions and for communication between concentrators 108 and tags 104. Time slots are assigned by concentrators 108 and are sent to tags 104, where the time slots are used for communication between a specific tag 104 and concentrator 108. Tags 104 are not to communicate with concentrator 108 outside of their assigned time slot, as concentrator 108 will not be expecting a communication or advertising tags from the specific tag 104. Within the assigned time slot, the tag 104 assigned to said time slot may send advertising packets to concentrator 108 and may receive advertising packets from concentrator 108. For example, within the assigned time slot for tag 104, tag 104 may send an advertising packet with sensor data to concentrator 108. In another example, within the assigned time slot for tag 104, concentrator 108 may send an advertising packet confirming the receipt of sensor data. As the advertising packets are broadcast over BLE channels 37, 38, and 39 as one way BLE communications signals, the timing of when tag 104 is in transmitter mode to send advertising packets to concentrator 108, and when tag 104 is in receiver mode to receive advertising packets from concentrator 108 is important, so as to ensure that tag 104 minimizes any missed packets from concentrator 108 if tag 104 is not in the receiver mode. For example, tag 104 may send advertising packets with sensor data to concentrator 108, and then after transmitting the advertising packets via one way BLE communication signals, tag 104 may switch to receiver mode to await for a response from concentrator 108. Switching between transmitting and receiver mode on tag 104 also saves power in battery 720. Concentrator 108 may be in both transmitter and receiver mode as concentrator 108 does not have the same power saving requirements as tag 104.

In an alternate example, Tag 104 may be set into receiver mode for a series of predetermined durations within a time slot, allowing concentrator 108 to send advertising packets to tag 104 during this known duration. The windows upon which tags 104 are in receiver mode is managed by providing the durations to tag 104 from concentrator 108 when tag 104 is first discovered by concentrator 108, and by ensuring that the system clocks of both tag 104 and concentrator 108 are up to date and in sync with each other, through previous advertising packets with embedded time stamps. The discovery process where tag 104 may be first discovered by concentrator 108 will be discussed further below. A person skilled in the art will recognize the different configurations and variations in timing for tag 104 to switch between transmitter mode and receiver mode.

Each tag 104 that has been discovered by concentrator 108 is assigned at least one time slot under normal operating conditions for communication between the specific tag 104 and the specific concentrator 108, where the assigned time slot is exclusive to that specific tag 104 until the time slot is reassigned. Tag 104 may not be assigned at least one time slot if tag 104 is being serviced.

As communication between tag 104 and concentrator 108 is performed during the at least one assigned time slot, any time slots where tag 104 is not assigned to be communicating with concentrator 108, tag 104 may turn off communication interface 704 to conserve the power in battery 720 during the duration. Tag 104 may turn on communication interface 704 just prior to the assigned time slot to broadcast advertising packets. Tag 104 is aware of when to turn on communication interface 704 due to the system clock, and the assigned time slots align with concentrator 108 due to the system clocks of tag 104 and concentrator 108 being in sync with each other through previous advertising packets, discovery confirmation packets, or other packets between tag 104 and concentrator 108 with embedded time stamps.

Frames are composed of multiple time slots, as will be described below, and frames will cycle over time. Each frame may have time slots assigned to different tags 104. For example, a first frame may have time slots assigned to a first set of sixteen tags 104, while a second frame that occurs after the first frame may have time slots assigned to a second set of sixteen tags 104.

If all tags 104 in range are assigned at least one time slot, and there are remaining time slots available, the remaining time slots may be either reallocated by concentrator 108 to discovery time allocation for the discovery of additional tags as they enter the range of concentrator 108, or they may be assigned to other tags 104 within range to provide said tags 104 with more than one time slot so as to provide additional intervals for tags 104 to send sensor data to concentrator 108, or alternatively, some time slots may be left unassigned for tags 104 that have yet to be discovered.

Figure 16:
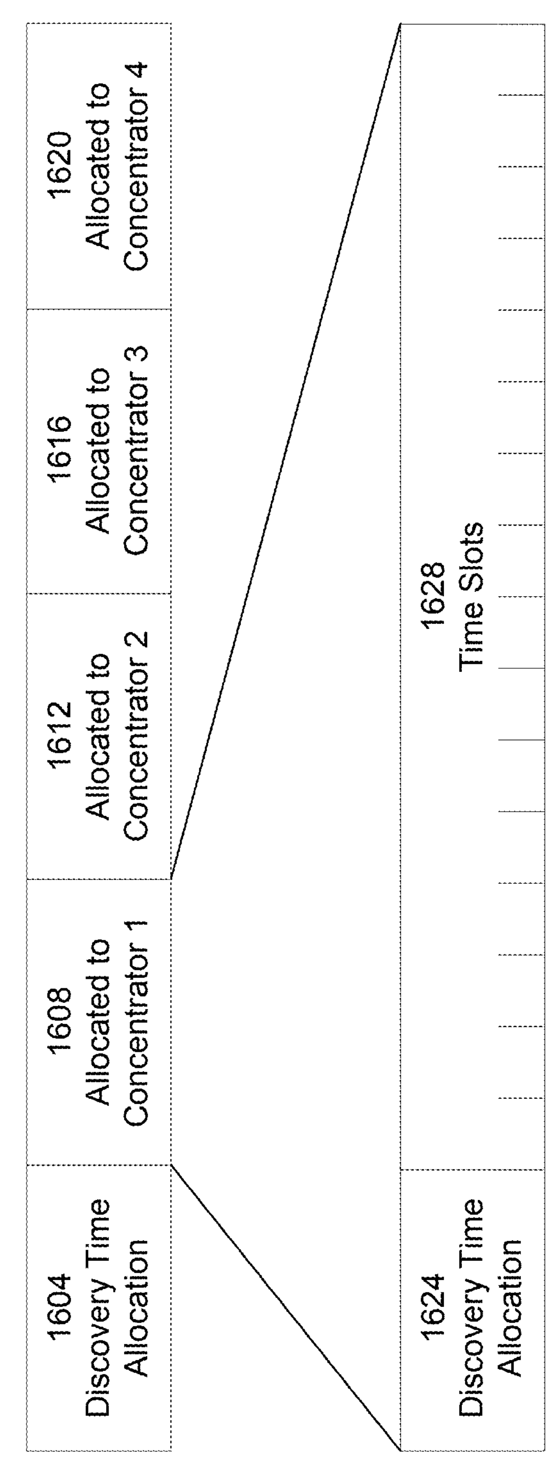
FIG. 16 depicts an example frame and timeslots for communication between concentrators and tags.

In the current embodiment of configuration 1000, a frame may contain 128 time slots, where each time slot has a duration of 64 milliseconds. As such, a frame will cycle and repeat every 8.192 seconds. Also, each tag 104 that us assigned a time slot will have a duration of 64 milliseconds to communicate with concentrator 108 via BLE communication. FIG. 16 depicts frame 1600, which includes discovery time allocation 1604, communication time allocated to a first concentrator 1608, communication time allocated to a second concentrator 1612, communication time allocated to a third concentrator 1616, and communication time allocated to a fourth concentrator 1620, wherein each allocation is composed of a plurality of time slots.

Figure 17:
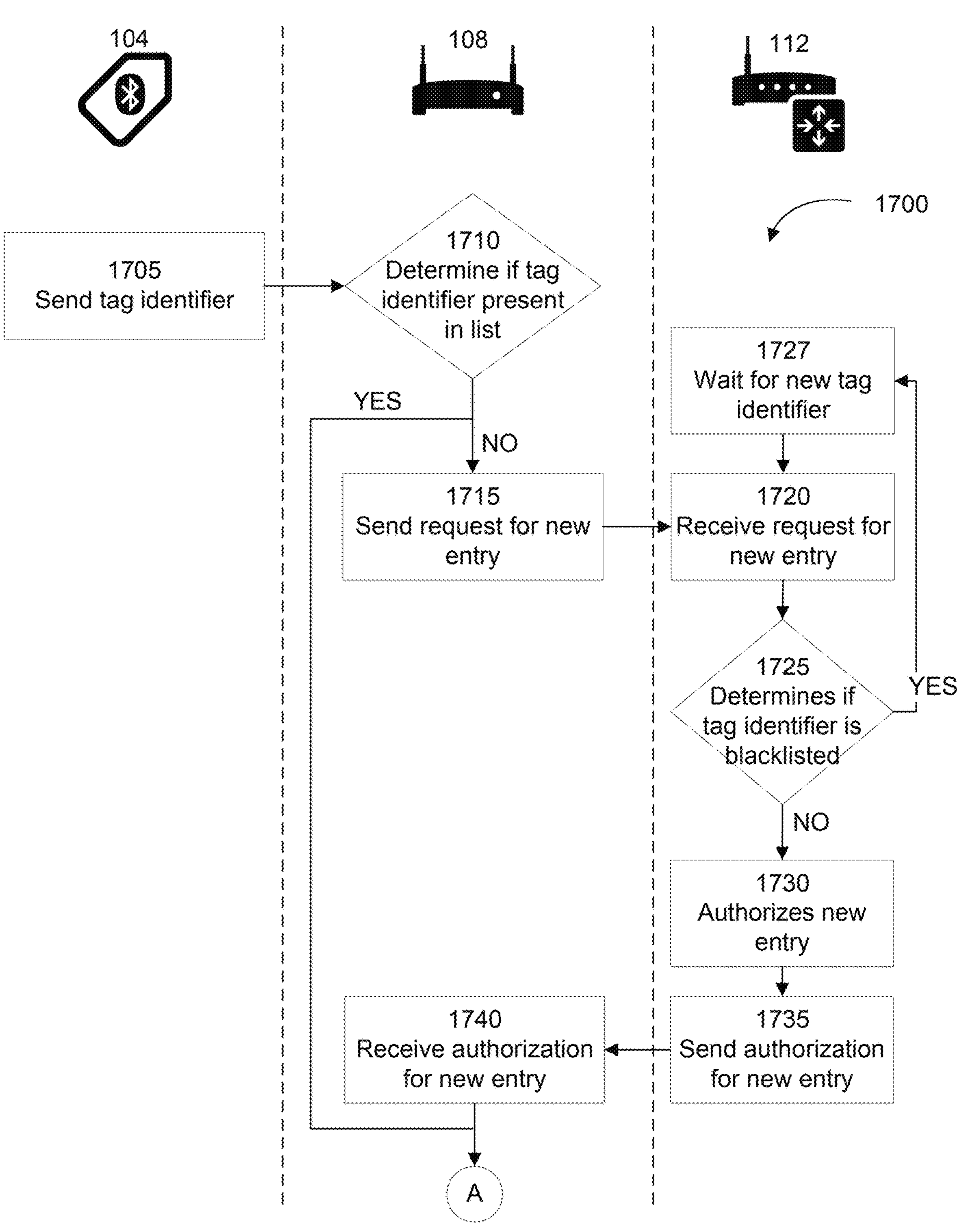
FIG. 17 depicts an example method of the discovery of tags into the system of FIG. 1.

Discovery time allocation 1604 may be used to discover new tags 104 that have come into range of the four concentrators 108, or tags 104 that are in range, but have yet to be assigned a time slot for communication. Communication time allocated to each concentrator 1608, 1612, 1616 and 1620 includes discovery time allocation 1624 and time slots 1628. Discovery time allocation 1624 is similar to discovery time allocation 1604 and will be further described below. Time slots 1628 are assigned to tags 104, and will also be further described below. Referring to FIG. 17, method 1700 shows the discovery process for tag 104.

At block 1705, tag 104 may broadcast its unique tag ID for a concentrator 108 to receive. After broadcasting, tag 104 will await to receive a response. If tag 104 is outside the coverage of concentrator 108, there will be no response from concentrator 108. If there is no response from concentrator 108 after a predetermined period of time, tag 104 will become dormant for another predetermined period of time, after which tag 104 may broadcast its unique tag ID again. More specifically, tag 104 may broadcast its unique tag ID as an advertising packet, herein also referred to as a discovery packet, over one way BLE communication signal. Once tag 104 has broadcast its unique tag ID, it will switch to receiver mode and wait for a response from concentrator 108. Tag 104 will stay in receiver mode for a short period of time. In the current embodiment, tag 104 will not stay in receiver mode for more than 20 milliseconds, after which, tag 104 will turn communication interface 704 off to conserver battery 720. By keeping communication interface 704 off, and staying in receiver mode only for a short period of time after broadcasting unique tag ID, tag 104 is able to receive responses from concentrator 108, while minimizing battery 720 usage if there is no response.

If concentrator 108 is within range of tag 104, it will receive the unique tag ID and determine if the respective tag 104 that is related to unique tag ID has previously been connected with concentrator 108 as depicted at block 1710. Concentrator 108 may have a list of unique tag IDs for tags 104 that have been pre-approved for connection, or a list of unique tag IDs for tags 104 that were previously connected with another concentrator 108 within the same logistical tracking network. The list of unique tag IDs may reside in memory 812, and processor 808 may check the received unique tag ID against the list.

If the unique tag ID is not within the list, concentrator 108 may proceed to request authorization from gateway 112 as depicted at block 1715. The request for authorization from concentrator 108 to gateway 112 may be accompanied with the unique tag ID of tag 104. At block 1720, gateway 112 receives the request for authorization for tag 104, and at block 1725, gateway 112 may determine if the unique tag ID has previously been blacklisted.

In the current embodiment, the list of blacklisted tags 104 may reside in memory 912, and processor 908 may check the list. In other embodiments, the list of blacklisted tags 104 may reside in memory 812, and processor 808 may check the list. The list of blacklisted tags 104 may be updated periodically through updates from gateway 112 or from site manager 116.

If tag 104 has been previously blacklisted, then tag 104 will not be allowed to interact with the network and a response will not be sent from concentrator 108 to tag 104. Gateway 112 will then revert to waiting for additional requests for authorization as depicted in block 1727. If tag 104 has not been previously blacklisted, then gateway 112 will authorize the entry of the tag 104 into the logistical tracking network, and send the authorization to concentrator 108. This is depicted at blocks 1730 and 1735.

In alternative embodiments, instead of processor 908 checking if tag 104 has been blacklisted, processor 908 may check a list of whitelisted tags 104 to determine if tag 104 may be allowed into the network. In this embodiment, where there may be a list of whitelisted tags residing in memory 912, the list of whitelisted tags may be provided to gateway 112 either initially when the network is being setup, or when new tags 104 are expected to be added to the network. The person skilled in the art will recognize the different methods and possibilities of determining whether tag 104 may be allowed into a network.

Figure 18:
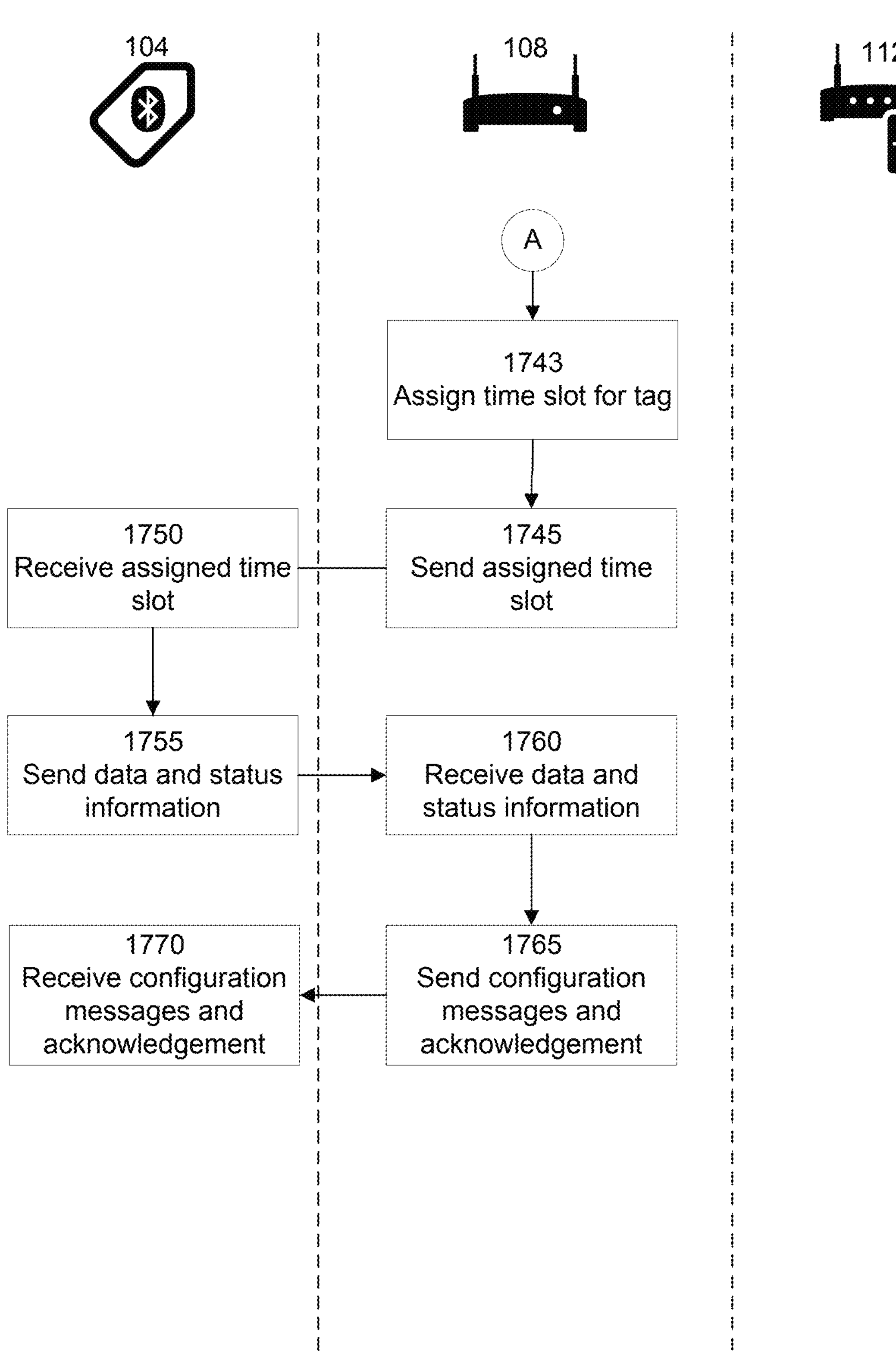
FIG. 18 depicts a continuation of the example method of FIG. 17.

If the unique tag ID is within the list, then concentrator 108 may receive the authorization for new entry at block 1740, and then can proceed to assign at least one time slot for tag 104 using concentrator time slot manager 820 as depicted at block 1743, as can be seen in FIG. 18. At block 1745, concentrator 108 sends the assigned time slot to tag 104. As previously discussed, time slots for tags 104 are associated with communication time allocated towards a concentrator 108. More specifically, the time slot 104 assigned to tag 104 is associated with concentrator 108 that is within range and receives the unique tag ID. Concentrator 108 generates and broadcasts an advertising package that includes the assigned time slot, the unique tag ID that is associated with tag 104 that has been approved and assigned the time slot, and a destination concentrator ID, also referred to herein as a discovery confirmation packet. The unique tag ID allows tag 104 to determine if the discovery confirmation packet is for said tag 104, by decoding and decrypting the discovery confirmation packet and determining if unique tag ID is associated with said tag 104. If the unique tag ID in discovery confirmation packet is associated with said tag 104, then said tag 104 may store the destination concentrator ID and the assigned time slot in memory 712 for later communications with concentrator 108. If the unique tag ID in the discovery confirmation packet is not associated with said tag 104, then said tag 104 will know that discovery confirmation packet is not intended for said tag 104 and will not store the destination concentrator ID and the assigned time slot in memory 712. The destination concentrator ID may be included in advertising packets generated and broadcast by tag 104 in later communications during the assigned time slot, so as to allow concentrator 108 to determine that a broadcast from tag 104 over BLE communication signal during its assigned time slot is intended for concentrator 108.

At block 1750, tag 104 receives the assigned time slot, and may begin sending data in the form of advertising packets to concentrator 108 during the assigned time slot, where concentrator 108 may then relay to gateway 112.

In the current embodiment, tag 104 may also optionally send status information to concentrator 108, as depicted at block 1755. The status information sent to concentrator 108 may include additional configuration parameters to verify that tag 104 is operating under specific conditions. Configuration parameters may include, but are not limited to, the frequency of tag 104 sending out its unique tag ID when trying to connect to concentrator 108, the frequency of retrieval of sensor data from sensors 716, the threshold for alarms, and the sending of only threshold alarms and not sensor data, and/or the like. Tag 104 may also optionally send a configuration code to concentrator 108 to verify if tag 104 has a compatible configuration code. The configuration code may be an ID to designate a customer's specific network and the version or revision of code being operated, also known as a software version, by tag 104 and concentrator 108. This is to ensure that tag 104 and concentrator 108 are operating on the same version of software, and have the same configuration parameters. This is important, as a difference in configuration parameters may lead to a mishandling of communications between tag 104 and concentrator 108. For example, if tag 104 is configured to gather or retrieve sensor data at a rate that is faster than is expected by concentrator 108, there may be more advertising packets sent from tag 104 than expected, or there may be excess sensor data being collected and stored on tag 104, using up memory 712. As indicated above, the determination of whether tag 104 and concentrator 108 have compatible configurations is based on determining if tag 104 has an associated configuration code to concentrator 108. In alternate embodiments, the configuration codes on tag 104 and concentrator 108 may be the same, and determination of whether tag 104 and concentrator 108 have compatible configurations may be a comparison of the two configuration codes to determine whether they are the same.

In alternate embodiments, a configuration code may also be used to designate specific facilities within a network, where the verification process of a configuration code may be a two step process, where the customer's network and software version, may be verified first, after which the facility configuration code is verified. This allows for the verification of whether tag 104 is on the correct network, after which the configuration parameters for a specific facility may be verified, allowing tag 104 to not be rejected if on the correct network, but forced to sync configuration parameters if tag 104 is moving between facilities. An example of where facility configuration parameters may be different within the same network, is if a trouble spot was identified in a specific facility, and additional sensor readings were required in said facility to determine potential issues. The use of configuration codes allows for a reduction of data volume and latency, as the configuration code as a string will be able to determine multiple variables and configurations of tag 104. The person skilled in the art will recognize the different configuration parameters and configuration codes that may be used to set tag 104 operation parameters, and also to verify tag 104 configurations.

While configuration parameters and configuration codes are exchanged during the discovery process, they may also be exchanged if update commands are issued upstream at components upstream in the network, such as at gateway 112.

Returning to FIG. 18, at block 1760, concentrator 108 receives the status information and verifies whether tag 104 has the correct configuration parameters and configuration codes. At block 1765, concentrator 108 may send updated configuration parameters and configuration codes if tag 104 is out of date, or has been out of contact with concentrator 108 for a period of time. Alternatively, if tag 104 has just been added to the network, concentrator 108 may send new configuration parameters and configuration codes to tag 104. At block 1770 tag 104 receives the configuration codes and configuration parameters and provides acknowledgement to concentrator 108 of receipt of update.

After the completion of the discovery process depicted as method 1700, tag 104 may turn off communication interface 704 to conserve power of battery 720. As tag 104 has been assigned a time slot to communicate with concentrator 108, tag 104 may turn on communication interface 704 at its assigned time slot to communicate with concentrator 108 over one way BLE communication signal. By turning off communication interface 704 between the discovery process and the sending of sensor data during the assigned time slot for tag 104, power of battery 720 is conserved.

Returning to FIG. 16, as previously mentioned, frame 1600 includes communication time allocated to a first concentrator 1608, communication time allocated to a second concentrator 1612, communication time allocated to a third concentrator 1616, and communication time allocated to a fourth concentrator 1620. Each communication time allocated to a concentrator 108 includes time slots 1628 and may include a discovery time allocation 1624.

Similar to discovery time allocation 1604, discovery time allocation 1624 may be used to receive new tag 104 IDs when new tags 104 are added to the network, or when tags 104 come into range of concentrator 108 and attempt discovery. Discovery time allocation 1624 is optional and augments discovery time allocation 1604, hence increasing the time available for concentrator 108 to receive new unique tag IDs for tags 104 looking to be discovered. The difference between discovery time allocation 1604 and discovery time allocation 1624 is the placement of the discovery time within frame 1600. More specifically, discovery time allocation 1604 is placed as a time allocation at the beginning of frame 1600, whereas discovery time allocation 1624 re-occurs within frame 1600. Since frame 1600 repeats itself as well, this means that the difference between discovery time allocation 1604 and discovery time allocation 1624 is the frequency of occurrence, where discovery time allocation 1624 occurs more frequently, but with a shorter duration. A higher frequency of discovery time allows for a higher potential and higher probability of detection of tags 104 as they enter network, as tags 104 are broadcasting their unique tag IDs at time intervals that need to coincide with the discovery time allocation. However, a longer duration of discovery time also allows for the discovery of a larger number of tags 104, if a larger number of tags 104 is introduced to concentrator 108 at the same time. As such, depending on the needs of the network, frame 1600 may be adjusted accordingly to use either discovery time allocation 1604, discovery time allocation 1624, or both. The person skilled in the art will recognize the different configurations of discovery time allocation 1604 or discovery time allocation 1624 within frame 1600. The person skilled in the art will also recognize that discovery time allocations and its configurations may be re-arranged and adjusted in frame 1600 depending on the needs of the network.

Time slots 1628 may be used for communication with tags 104. As previously indicated, tags 104 are assigned respective time slots for communication upon discovery into the logistical tracking network. In the current embodiment, there are 16 time slots of 64 milliseconds, where each time slot may be dedicated towards a single tag 104. In other embodiments, depending on the size of frame 1600, and the number of concentrators 108 in the logistical tracking network, the number of time slots for allocated to each concentrator 108 may differ as long as each tag 140 is allocated at least one time slot per frame. By changing the size of frame 1600 or the number of concentrators 108, the available capacity to cover tags 104 may differ.

Figure 19:
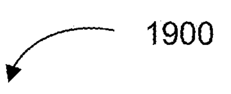
FIG. 19 depicts an example chart of the time period of frames for four concentrators.

Alternatively, if the logistical tracking network were to remain with four concentrators 108, and a single gateway 112, the number of tags 104 serviced may be adjusted based on the number of frames to be cycled. As can be seen in FIG. 19, table 1900 shows that if the tag 104 density in an area is up to 8192 tags 104, then 128 frames are needed. Similarly if tag 104 density in an area is up to 16384 tags 104, then 256 frames are needed. The person skilled in the art will recognize that there are various combinations of designs of logistical tracking network to accommodate the number of tags 104 in an area, including the number of frames, the frame length, and the number of concentrators 108. The person skilled in the art will also recognize the different potential configurations possible with time slots, allocations, and discovery time allocations within frame 1600.

In order to ensure that tags 104, concentrators 108 and gateways 112 operate in sync and send and receive transmissions within the proper time slots, gateway 112 provides a system time clock using the network time protocol service. As previously discussed, tags 104 and concentrators 108 work in sync by referring to a system clock that is regularly synced between tag 104 and concentrator 108, allowing tag 104 to be in broadcast mode, while concentrator 108 is in receiver mode, and vice versa. The current time based on the system clock is relayed within advertising packets when transmitting to concentrator 108, and similarly relayed to tag 104. As such, time stamps in logs and accurate use of time slots can be maintained. Furthermore the time stamps allow tag 104 and concentrator 108 to ensure that the system clock is up to date.

Figure 20:
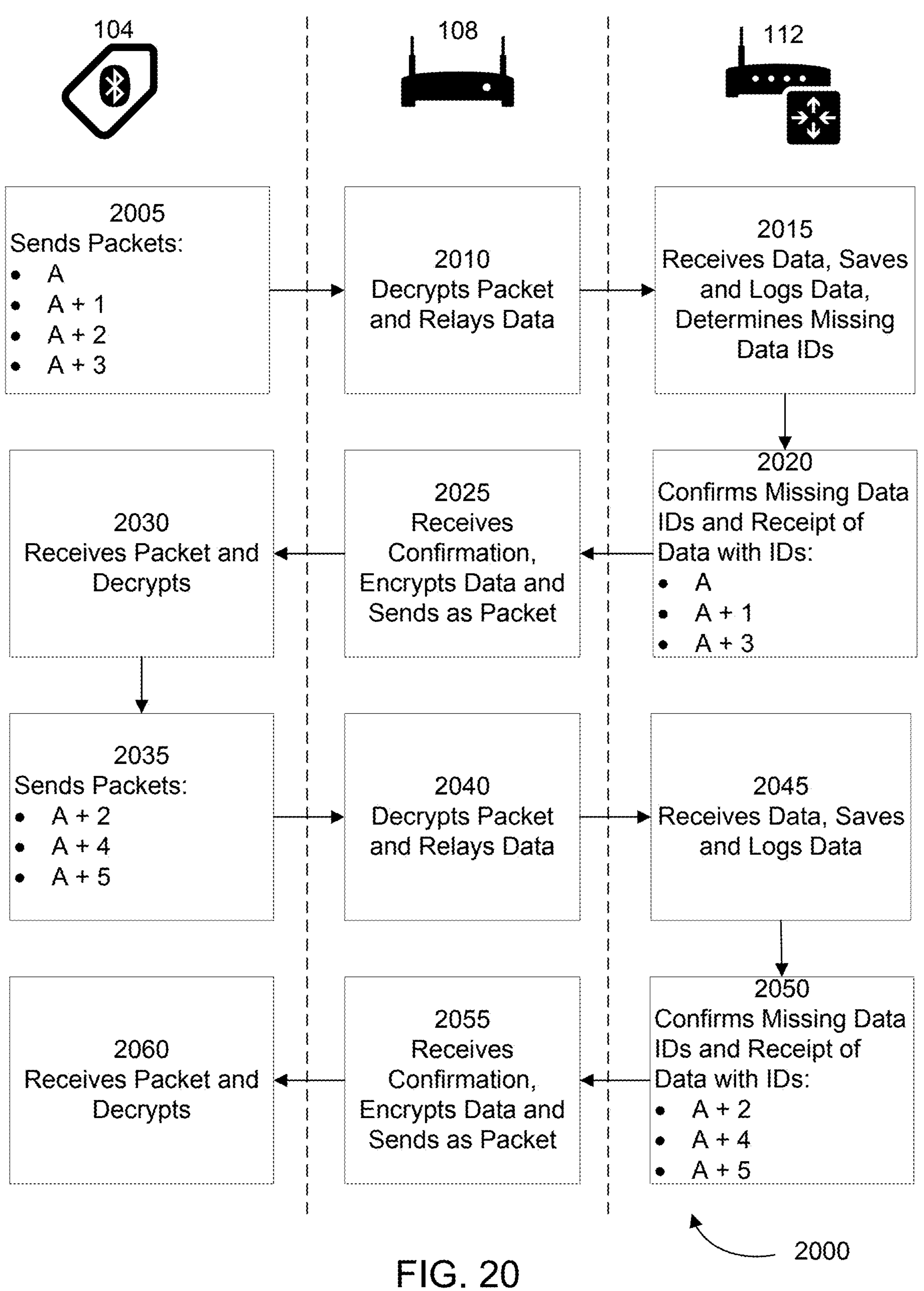
FIG. 20 depicts an example method for the sending of sensor data from the tags to gateways, via concentrators.

As previously mentioned, after tag 104 has been discovered, it can send advertising packets to concentrator 108 to be decoded and decrypted, and the sensor data relayed to gateway 112. In addition, as previously mentioned, as part of normal operation, tag 104 broadcasts sensor data in the form of advertising packets over channels 37, 38, and 39 as one-way BLE communication signals during its assigned time slot. The sending of advertising packets from tags 104 to concentrator 108 and the relaying of data decoded from the advertising packets to gateway 112 is coordinated by transport protocol 920 depicted as method 2000 in FIG. 20. This includes assured data delivery from tags 104 to gateway 112, ensuring that data is not lost due to signal interference, corruption in the transmission or where the transmission contains a large amount of data and may exceed the assigned time slot.

Once sensor data has been relayed to gateway 112, gateway 112 stores and logs the sensor data, and generates a confirmation of receipt in the form of a 16 bit mask. The confirmation of receipt indicates which data was received by gateway 112 and which data was not received by gateway 112. The confirmation of receipt is sent from gateway 112 to concentrator 108, where it is converted and encrypted into an advertising packet to be sent to tag 104. With the knowledge of what data was received by gateway 112, tag 104 is then able to resend any data that was not received, as well as any newly acquired sensor data.

To ensure that data is not lost, advertising packets that are sent from tag 104 to concentrator 108 are saved with the respective sensor data and logged in tag 104, and only removed from memory 712 and the log in tag 104 after tag 104 receives confirmation that gateway 112 has received the advertising packets and sensor data.

Method 2000 depicts the method of sending sensor data gathered from tags 104 to gateway 112 via concentrator 108, and also the method of ensuring data delivery from tags 104 to gateway 112. Method 2000 will be further described below.

At block 2005, tag 104 may send advertising packets during its allocated time slot. Processor 708 may take the sensor data from memory 712, encrypt the sensor data as advertising packets using payload encoding 724 and send the encrypted advertising packets to concentrator 108 via BLE communication signal. Advertising packets include the unique tag ID and the unique advertising packet ID. Referring to FIG. 25, an example advertising packet 2608 may be seen. Advertising packet 2608 includes unique tag ID 2608-A, destination concentrator ID 2608-D, advertising packet ID 2608-S, batch state indicator 2608-B and sensor data 2608-M. The unique tag ID is associated with tag 104, and hence provides identification of the tag 104 that generated the encrypted advertising packet. The unique advertising packet ID is generated consecutively based on the order of advertising packets generated from sensor data. Returning to FIG. 20, for example, advertising packets with unique advertising packet IDs A, A+1, A+2 and A+3 are consecutively generated advertising packets from the same tag 104 based on the gathering of sensor data. More specifically, advertising packets with unique advertising packet IDs A, A+1, A+2 and A+3 indicate that advertising packet IDs were generated in chronological order, one after another, with sensor data being gathered in the same chronological order. It should be noted though that while advertising packets are generated in chronological order and include consecutive numbered advertising packet IDs based on the generation of the advertising packets, advertising packets with advertising packet IDs may be sent out in non-consecutive order, as will be discussed below. For example, advertising packets A, A+1, A+2 and A+3 may be successively sent during the assigned time slot from tag 104 to concentrator 108. The successive sending of advertising packets with advertising packet IDs A, A+1, A+2, and A+3 may be considered a batch of advertising packets. In the current embodiment, a batch of advertising packets may have a maximum of 16 advertising packets, and the initial advertising packet of a batch may be indicated at the batch state indicator included in advertising packets. The maximum number of advertising packets correlates to the multi-bit mask of the confirmation of receipt that is sent from gateway 112 to concentrator 108, and then converted into an advertising packet to be sent from concentrator 108 to tag 104. The confirmation of receipt will be further discussed below. In the current embodiment, the confirmation of receipt uses a 16 bit mask, where each of the 16 digits within the 16 bit mask refers to whether an advertising packet was successfully received and logged by gateway 112. As such, a maximum of 16 advertising packets may be successively sent as part of a batch. Only after tag 104 receives the confirmation of receipt with the 16 bit mask can a second set of a maximum of 16 advertising packets be sent successively.

While the maximum number of advertising packets in a batch may be limited, tags 104 are not limited to sending the maximum number of packets, and may send any number of advertising packets up to the maximum number of advertising packets in a batch. The number of advertising packets sent may be dependent on several factors, including how long tag 104 was outside the logistical tracking network, or the frequency sensor data is gathered at tag 104. For example, if a tag 104 were outside the logistical tracking network for a protracted period of time, such as being transported with goods over a long distance, there would be an increased number of advertising packets to transmit to concentrator 108.

While generating advertising packets at tag 104, the advertising packets include the destination concentrator ID. Tag 104 is aware of the destination concentrator ID as a result of the discovery process as previously described in method 1700, where the destination concentrator ID is associated to the concentrator 108 that assigned the time slot to tag 104. As such, while tag 104 may broadcast advertising packets via one way BLE communication signal, each concentrator 108 in range will receive the advertising packet and decode the advertising packet to determine the intended destination concentrator ID. If the decoding concentrator 108 matches or is associated to the intended destination concentrator ID, said concentrator 108 will continue with the actions at block 2010. If the decoding concentrator 108 does not match or is not associated with the intended destination concentrator ID, said concentrator 108 will cease and delete the received advertising packet. An example of a destination concentrator ID may be seen in FIG. 25 as destination concentrator ID 2608-D.

In alternate embodiments, concentrator 108 may keep a list of connected tags 104, which may be updated if tag 104 does not communicate with concentrator 108 a predetermined consecutive number of times. Concentrator 108 may determine if an advertising packet being broadcast from tag 104 is intended for said concentrator by reviewing the unique tag ID as part of the advertising packet and comparing the unique tag ID with the list of connected tags 104. If the unique tag ID matches or is associated with one of the tags 104 on the list of connected tags 104, said concentrator 108 may continue with the actions at block 2010. If the unique tag ID does not match or is not associated with one of the tags 104 on the list of connected tags, said concentrator 108 may delete the received advertising packet. A person skilled in the art will recognize the different available methods of determining whether an advertising packet that is broadcast over one-way BLE communication is intended for concentrator 108.

Returning to FIG. 20, at block 2010, concentrator 108 receives the advertising packets for decoding and decryption. More specifically, as advertising packets are to conform to the one way BLE communication standards, the advertising packet is decoded and decrypted to access the sensor data to send the sensor data, the unique tag ID and the advertising packet ID in a compatible format between concentrator 108 and gateway 112. Once the advertising packet has been decoded and decrypted, the sensor data, the unique tag ID and the unique advertising packet ID from the advertising packet is forwarded to gateway 112. More specifically, concentrator 108 relays the data from advertising packets to gateway 112 after having received them wirelessly from tags 104. At block 2015, the sensor data, unique tag ID and unique advertising packet ID is received by gateway 112. The sensor data, unique tag ID and unique advertising packet ID is saved and logged based on the time stamp of receipt.

Figure 26:
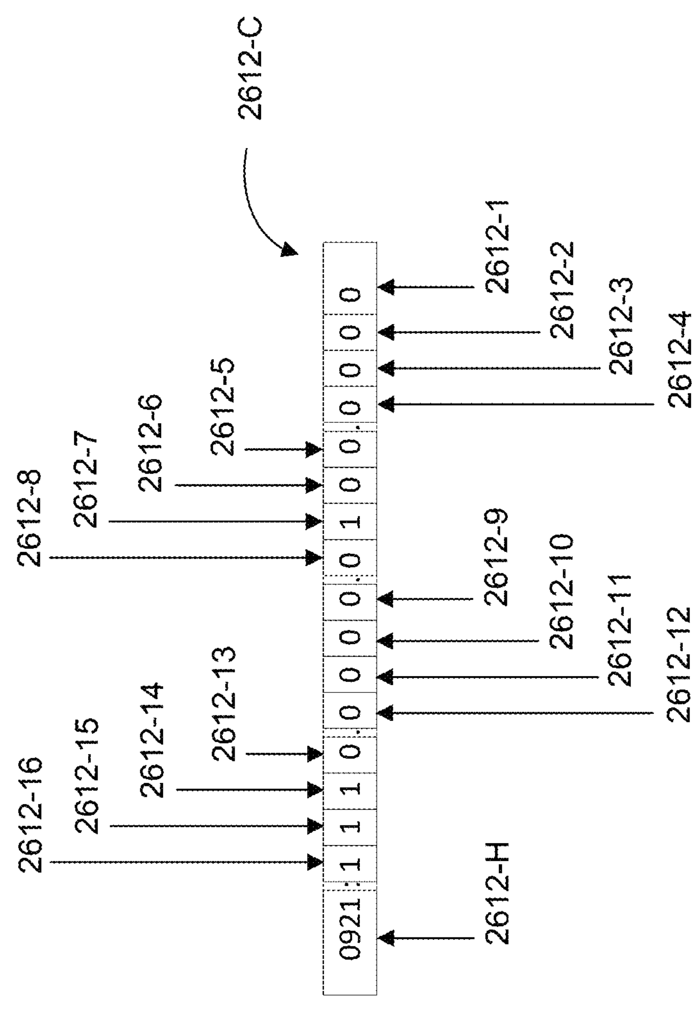
FIG. 26 depicts an example confirmation mask that is sent from the concentrator to the tag as can be seen in FIG. 25.

At block 2020, gateway 112 provides confirmation of receipt to be sent back to tag 104 via concentrator 108 of the data that is confirmed to be received. Data that is not received may be due to any number of reasons, including, but not limited to corruption of data or interference in BLE signal between tag 104 and concentrator 108, or signal degradation due to distance between concentrator 108 and gateway 112. The confirmation of receipt includes the previously mentioned 16 bit mask. In the current embodiment, a 16 bit mask is used, but it will occur to a person skilled in the art that any number of bits may be used in the mask. The 16 bit mask includes a header, and 16 digits where each digit represents whether an advertising packet has been received by gateway 112. Referring to FIG. 26, an example confirmation of receipt 2612-C is displayed. Values of 2612-1 to 2612-16 of the 16 bit mask are binary and may be 0 or 1, where 0 indicates that the sensor data has been received by gateway 112, and where 1 indicates that the sensor data has not been received by gateway 112. Value 2612-1 represents whether the sensor data associated with the advertising packet ID at header 2612-H has been received. In the example confirmation of receipt 2612-C, value 2612-1 is 0, and indicates that advertising packet ID 0921, as indicated at header 2612-H, has been received by gateway 112. Value 2612-2 represents whether the sensor data associated with the next consecutive advertising packed ID has been received by gateway 112. In the example confirmation of receipt 2612-C, value 2612-2 is 0, and indicates that the next consecutive advertising packet ID 0922, has been received by gateway 112. Similarly, value 2612-3 represents whether advertising packet ID 0923 has been received by gateway 112. A person skilled in the art will recognize that values 2612-4 to 2612-16 represent the next 12 consecutively numbered advertising packet IDs, and whether they have been received by gateway 112.

Determination by gateway 112 of whether sensor data has been received at gateway 112 is possible due to the consecutive numbering of advertising packet IDs as they are generated at tag 104. As the data sent to gateway 112 includes advertising packet IDs and unique tag IDs, gateway 112 is able to determine which data is missing. Returning to FIG. 20, at block 2020, gateway 112 is able to determine that the data associated with the advertising packet ID A+2 is missing, as it is able to receive up to 16 advertising packets successively in a batch. In the current embodiment, from the perspective of gateway 112, the advertising packets not received are advertising packet IDs A+2, A+4, A+5 . . . A+15. As such, gateway 112 may generate a confirmation of receipt with a 16 bit mask with a header of "A" to represent the right-most digit of the 16 bit mask, and the value of "1" for the digits representing advertising packet IDs A+2, A+4, A+5 . . . A+15. More specifically, in the current embodiment, the confirmation of receipt may appear to be "A: 1111.1111.1111.0100".

At block 2025, concentrator 108 receives the confirmation of receipt from gateway 112. The confirmation of receipt is then encoded and encrypted into an advertising packet to be broadcast to tag 104 from concentrator 108 to conform with the one way BLE communication signal between tag 104 and concentrator 108. The advertising packet comprising the confirmation of receipt may also be referred to herein as a confirmation packet.

At block 2030, the confirmation packet from concentrator 108 is received by tag 104 and is decrypted. Tag 104 may determine based on the confirmation of receipt and the 16 bit mask that sensor data associated with advertising packets with advertising packet IDs A+2, A+4, A+5 . . . A+15 will need to be sent to concentrator 108. Tag 104 will also be able to determine based on the same data that sensor data associated with advertising packets with advertising packet IDs of A, A+1 and A+3 were received by gateway 112. Tag 104 may then remove from memory 712 up to sensor data associated with advertising packets with advertising packet IDs A+1. More specifically, sensor data associated with advertising packets with advertising packet IDs of A and A+1 may be removed from memory 712. Sensor data associated with advertising packet with advertising packet ID of A+3 may be left on memory to ensure consecutive numbering of advertising packet IDs. In alternate embodiments, tag 104 may remove from memory 712 any sensor data that has been confirmed by gateway 112. More specifically, sensor data associated with advertising packets with advertising packet IDs A, A+1 and A+3 may be removed.

At block 2035, sensor data that needs to be resent, and any new sensor data may be encrypted and encoded as advertising packets and sent from tag 104 to concentrator 108 to be decoded and decrypted and the data relayed to gateway 112. As previously indicated, in the current embodiment, this means that sensor data associated with advertising tags with advertising packet IDs of A+2, A+4, A+5 . . . A+15 will need to be sent. In addition, tag 105 may also send sensor data associated with advertising tags with advertising packet IDs of A+16 and A+17. This is due to the maximum number of advertising packets being able to be sent as being 16 advertising packers in our current embodiment. It should be noted that the maximum number of advertising packets is based off of the consecutive numbering of advertising packet IDs from the initial advertising packet ID being sent in the batch. As such, as A+2 is the initial advertising packet ID, being the lowest advertising packet ID number, the batch may only contain up to an advertising packet ID number of A+17.

As was previously discussed, while the limited to the maximum number of advertising packets that may be sent from tag 104 to concentrator 108, tag 104 may send any number of advertising packets below the maximum number of advertising packets. As such, while advertising packet IDs A+2, A+4, A+5 . . . A+15, A+16 and A+17 are to be sent, if sensor data has not yet been gathered, advertising packets do not need to be sent. In the current example, sensor data for advertising packet IDs A+4 and A+5 have been gathered, and advertising packets may be generated with the respective advertising packet IDs and unique tag IDs. More specifically, processor 708 may take the data from memory 712, encrypt and encode the data as advertising packets, along with the unique tag ID and advertising packet ID and send the advertising packets to concentrator 108. In the current embodiment, the previously unconfirmed advertising packet ID A+2 is resent, along with new advertising packets A+4 and A+5. If there is remaining time available within the time slot, where the initial advertising packets in block 2005 were sent, then the advertising packets may be broadcast over one way BLE communication signal from tag 104 to concentrator 108 within the same time slot. If there is not enough time remaining in said time slot, tag 104 may wait till the next available time slot in another frame to broadcast over one way BLE communication signal from tag 104 to concentrator 108. Alternatively if there is some time remaining in the first time slot, a first advertising packet may be sent within the first time slot, and if there is not enough time remaining, the second and remaining advertising packets may be sent in the next available assigned time slot in another frame. A person skilled in the art will recognize the different combinations in sending multiple advertising packets within multiple assigned time slots in different frames.

At block 2040, the advertising packets received from tags 104 are decoded and decrypted. The data is then relayed to gateway 112. Similar to block 2015, the data is received at block 2045, where the sensor data is stored in memory 912. At block 2050, gateway 112 confirms the receipt of data that is stored in memory 912. In the current embodiment, all the data, both the data that was resent, A+2 and the new data A+4 and A+5 are received and stored, and gateway 112 provides confirmation of receipt of said data as a 16 bit mask to concentrator 108. At block 2055 concentrator 108 encodes the confirmation of receipt and 16 bit mask to be sent as an advertising packet and sends the confirmation packet to tag 104, where it is received at block 2060. The cycle may then repeat itself where tag 104 can send new advertising packets with new sensor data in its assigned time slot. As such, with gateway 112 providing confirmation, assured data delivery is achieved.

Referring to FIG. 25, an exemplary screenshot 2600 of this process is provided. Allocated time frames 2604-1 and 2604-2 allow for the connection of different tags 104 to concentrators 108, and the combination of time frames 2604-1 and 2604-2 make up frame 1600. Time frame 2604-3 is the re-occurrence of time frame 2604-1 in a new cycle of frame 1600. Discovery time allocation is not depicted in screenshot 2600.

As can be seen, advertising packet 2608 is sent from tag 104 to concentrator 108, with a sequence ID 2608-S of 00921. Sequence ID 2608-S provides an identifier for advertising packets and is unique to the advertising packet. Advertising packet 2608 also includes a unique tag ID 2608-A, which in the current example is 5aa7, the last four digits of the media access control ("MAC") address of tag 104. Advertising packet 2608 also includes the destination concentrator ID, allowing concentrator 108 to determine whether an advertising packet from tag 104 is addressed to said concentrator 108, or potentially another concentrator 108 in range. Advertising packet 2608 further includes batch state indicator 2608-B. In the current example, XFRBSEQ designates advertising packet 2608 as the initial advertising packet of a batch. The batch state indicator with XFER designation in the other advertising packets are the successively sent advertising packets after the initial advertising packet of a batch. Batch state indicator 2608-B also indicates to gateway 112 the header 2612-H to use in the confirmation of receipt. Sensor data 2608-M is also sent in advertising packet 2608. In the current example, advertising packet 2608 has a sequence ID 2608-S of 00921 and with sensor data 2608-M including a temperature measurement of 15.61° C. and a humidity of 48%.

Continuing with FIG. 25, advertising packet 2612 is sent from concentrator 108 to tag 104, and contains 16 bit mask 2612-C. This 16 bit mask contains information pertaining to the specific advertising packets that were received, and the sensor data that was confirmed to be received by gateway 112. Referring to FIG. 26, the 16 bit mask 2612-C may be broken down into 16 digits, indicated as 2612-1 to 2612-16 from right to left. Each digit represents whether a specific advertising packet was received and whether the sensor data was confirmed to be received by gateway 112. More specifically, a value of zero means that the sensor data was confirmed to be received by gateway 112, and a value of one means that the sensor data was not received by gateway 112. The first digit on the right, 2612-1 represents the advertising packet of 2612-H. As such, in the current example, the first digit represents sequence ID 2608-S of 00921, and indicates that gateway 112 received the sensor data in advertising packet 2608. The second digit, 2612-2 represents the next advertising packet with a sequence ID of 00922. The third digit, 2612-3 represents the next advertising packet with a sequence ID of 00923. Each subsequent digit represents the next subsequent advertising packet. As can be seen by the current example, the first value of one when reading right to left is at 2612-7, which represents an advertising packet with a sequence ID of 00927. As such, tag 104 will need to re-send the sensor data and advertising packet with a sequence ID of 00927.

Returning to FIG. 25, tag 104 re-sends the advertising packet 2616 with sequence ID 2616-S of 00927 in the time frame 2604-3 with the sensor data of 2616-M. Tag 104 can also be seen sending advertising packets with advertising packet IDs 00934 and 00935 with newly gathered sensor data. Advertising packet 2620 from concentrator 108 to tag 104 shows a new 16 bit mask 2620-C which indicates that sensor data from sequence ID 0027 is confirmed to be received by gateway 112, as is provided by the value of zero in the first digit on the right of the mask, as is represented by the header of 00927.

As can be seen by the aforementioned example, the header of the 16 bit mask changes to represent the first non-received advertising packet sequence ID of previous advertising packets sent, and is based on the batch state indicator of the previously received packets. As previously indicated, the header of the 16 bit mask changes, and will reflect the previous batch state indicator indicating the initial advertising packet of the batch. As such, the 16 bit mask is a rolling window, where the first digit in the 16 bit mask "rolls" and is changed according to the header of the 16 bit mask, and the first non-received advertising packet sequence ID of previous advertising packets sent.

If tag 104 is outside of the coverage of any concentrator 108 for a protracted period of time, there will be a backlog of sensor data in tag 104. While method 2000 will allow for the delivery of sensor data from tag 104 to gateway 112, it may require many frames and cycles, and hence may take a long period of time. As such, if there is a significant amount of data to transmit, concentrator 108 may assign said tag 104 with the maximum number of unused frames and timeslots, or alternatively, concentrator 108 may dedicate a fixed slot or a pre-set period of time to ensure that all data is transferred.

When tags 104 roam around the coverage of concentrators 108, and move from a first concentrator 108 to a second concentrator 108, tag 104 will continue to be serviced. In FIG. 21, tag 104 can be seen being moved from a first concentrator 108 into a region overlapped by the first concentrator 108 and a second concentrator 108, and then moving into a region solely covered by the second concentrator 108. During this movement, tag 104 remains associated and continues communicating with the first concentrator 108 in both the region covered by the first concentrator 108 and the region covered by both concentrators 108. Once tag 104 leaves the coverage of the first concentrator 108 and is in the region only covered by the second concentrator 108, it will re-associate itself with the second concentrator 108 and begin communicating with the second concentrator 108.

In certain circumstances, there may be a temporary blockage, resulting in a temporary loss of communication between tag 104 and concentrator 108. An example of this may include vehicles moving around the coverage area of concentrator 108 blocking the signal between concentrator 108 and tag 104. While the loss of communications may be temporary, if tag 104 is in range of a second concentrator 108, tag 104 may re-associate itself with the second concentrator 108 and begin communicating with the second concentrator 108. Tag 104 may wait for a predetermined number of failed responses before attempting to re-associate itself with the second concentrator 108. For example, if tag 104 fails to receive a response for sending a batch of advertising packets, tag 104 may initiate a counter to count the number of failed responses from concentrator 108 and gateway 112. More specifically, for each batch state indicator of XFRBSEQ, if there is no confirmation packet received in response from concentrator 108 to tag 104, the aforementioned counter may increase. If the counter reaches a predetermined number of failed responses, such as three failed responses, tag 104 may then attempt to associate itself with a second concentrator 108 if it is in range. The value of the counter may either be set as the predetermined threshold of unacceptable failed responses, and then reduced by one for each failed response, or alternatively, the value of the counter may be set as zero and then increased by one for each failed response, until the value of the counter reaches the predetermined number of failed responses. In other embodiments, a timer may be used instead of a counter, and when a predetermined amount of time has been reached where there have been no responses, tag 104 may attempt to associate itself with a second concentrator 108 in range. The person skilled in the art will recognize the different configurations possible for tag 104 to determine conditions to attempt to associate with a different concentrator 108.

In certain circumstances, a blockage, whether temporary or not, may result in tag 104 reassociating itself with another concentrator 108 associated with a different gateway 112 connected to the same site manager 116. In this circumstance, the second gateway 112 may communicate with site manager 116 as to the last frame received from tag 104. This ensures that the frame that the second gateway 112 is expecting to receive matches the one that is sent from tag 104, and that no data is lost when reassociating and communicating with a second concentrator 108 associated with a second gateway 112.

While in the currently described embodiment, tag 104 includes sensors, in some embodiments, tag 104 may not include sensors. In the embodiment where tag 104 does not include sensors, the unique tag ID provides the ability of the network to provide tracking data for tag 104. The unique tag ID allows for the tracking of the specific concentrator 108 that relayed data, and hence it can be deduced that tag 104 associated with the unique tag ID is within the BLE communication range of concentrator 108 at the time of sending the advertising packet with said unique tag ID. As such, the location of tag 104 may be tracked based on its connection with concentrator 108.

In alternative embodiments, sensors 716 may not be in tag 104, but may be located elsewhere and in communication with tag 104. An example of this may be if tag 104 is attached to an asset, however sensors 716 are located outside of the shipping container containing the asset to determine how the outside environment may affect the asset.

In addition, in alternative embodiments, tag 104 may not be attached to an asset, but may be in proximity to an asset, or may simply be associated with the asset or product. For example, tag 104 may be placed on the ceiling of a shipping container, as opposed to being on the asset itself being transported.

In alternative embodiments, tag 104 may not be attached to an asset, but rather may be used for other purposes, such as being attachable to persons. For example, tag 104 may be used to track the location of personnel as they travel through a facility. The person skilled in the art will recognize that there are many different configurations and placements for tag 104.

In an alternative embodiment, a configuration may be used where concentrators 108 are not present, and tags 104 communicate with gateways 112. In this embodiment, communication interface 904 of gateway 112 is able to communicate with tags 104 using advertising packets broadcast over one way BLE communication signals. Processor 908 of gateway 112 may perform all the functions of previously described processor 808 of concentrator 108, including, but not limited to, assigning time slots to tags 104, decrypting and decoding advertising packets received from tags 104 and encrypting and encoding confirmation of receipt into confirmation packets to be broadcast to tags 104 over one way BLE communication signals.

In an alternative embodiment, a configuration may be used where gateways 112 are not present, and tags 104 communicate with concentrators 108, and concentrators 108 perform the data storage and the generation of the confirmation of receipt to be sent to tags 104. More specifically, processor 808 of concentrator 108 may perform all the functions of previously described processor 908 of gateway 112, including, but not limited to, determining advertising packet IDs that may be missing from batches of advertising packets, generating confirmation of receipts and logging sensor data.

Although the foregoing description and accompanying drawings relate to specific preferred embodiments of the present invention as presently contemplated by the inventor, it will be understood that various changes, modifications and adaptations, may be made without departing from the spirit of the invention.

We claim:

1. A tag comprising:

a communications interface configured to receive and transmit data over Bluetooth low energy (BLE);

a processor configured to:

generate at least one data packet, the at least one data packet comprising at least a unique tag identification (ID) associated with the tag and a device ID associated with a device to which the at least one data packet is intended;

receive a time slot via one-way BLE communication from the device, the time slot assigned by the device, the time slot defining a period of time during which the tag is configured to transmit and to receive data; and broadcast the at least one data packet via one-way BLE communication using the communication interface during the time slot, the at least one data packet configured to be recognized by the receiving device by the device ID of the at least one data packet;

a memory configured to store the unique tag ID; and a power source.

2. The tag of claim 1, wherein the processor is further configured for:

generating at least one discovery packet, the at least one discovery packet comprising at least the unique tag ID;

broadcasting the at least one discovery packet via the one-way BLE communication using the communication interface; and receiving a discovery confirmation packet including the time slot and the device ID.

3. The tag of claim 1, wherein the processor is further configured for powering the communication interface only during the time slot.

4. The tag of claim 1, wherein the time slot assigned to the tag repeats at predetermined intervals.

5. The tag of claim 1, wherein the at least one data packet further comprises sensor data, the sensor data being received from at least one sensor.

6. The tag of claim 5, further comprising the at least one sensor, the sensor being configured to sense at least one parameter to generate the sensor data.

7. The tag of claim 1, wherein the at least one data packet comprises a plurality of data packets, each one of the data packets comprising a respective data packet ID.

8. The tag of claim 7, wherein the processor is further configured for:

receiving an identification of at least one of the data packets that was not received by the device; and broadcasting again the at least one of the data packets that was not received via the one-way BLE communication using the communication interface during the time slot assigned to the tag.

9. The tag of claim 8, wherein said receiving the identification comprises receiving a confirmation packet comprising one bit for each one of the data packets, each bit indicating whether its corresponding data packet has been received.

10. A device for identifying a tag, the device comprising:

a communication interface configured to receive and transmit data over Bluetooth low energy (BLE); a memory for storing at least a device identification (ID) associated with the at least one device;

at least one processor configured for:

determining a time slot, the time slot defining a period of time during which a tag is configured to transmit and receive data;

broadcasting the time slot and the device ID via one-way BLE communication;

receiving, via one-way Bluetooth low energy (BLE) communication, at least one data packet broadcasted by the tag during the assigned time slot, the at least one data packet including the device ID;

recognizing the device ID of the at least one data packet and if the device ID of the at least one data packet is associated with the device ID of the device and;

identifying the tag based on the at least one data packet; and outputting the identification of the tag.

11. The device of claim 10, wherein the at least one data packet comprises at least a unique tag ID associated with the tag and the device ID.

12. The device of claim 10, wherein the time slot assigned to the tag repeats at predetermined intervals.

13. The device of claim 12, wherein the processor is configured for, prior to said determining the time slot:

receiving a discovery packet broadcasted by the tag, the discovery packet comprising at least the unique tag ID, wherein said determining the time slot is performed in response to said receiving the discovery packet and said broadcasting the time slot comprises generating a discovery confirmation packet comprising the time slot and the device ID and broadcasting the discovery confirmation packet via the one-way BLE communication.

14. The device of claim 10, wherein the at least one data packet further comprises sensor data, the processor being further configured for one of:

storing the sensor data and the unique tag ID on the memory; and transmitting the sensor data and the unique tag ID to an external server.

15. The device of claim 10, wherein the at least one data packet comprising a plurality of data packets, each one of the data packets comprising a respective data packet ID.

16. The device of claim 15, wherein the processor is further configured for:

identifying at least one additional packet that was sent by the tag and is missing from the received data packets, thereby identifying at least one non-received packet; and broadcasting the identification of the at least one non-received packet along with the unique tag ID and the device ID via the one-way BLE communication during the time slot.

17. The device of claim 16, wherein the processor is configured for:

generating a confirmation packet being indicative of the data packet ID of the data packets that were received by the device, the identification of the at least one non-received packet, the unique tag ID and the device ID; and broadcasting the confirmation packet via the one-way BLE communication during the time slot.

18. The device of claim 17, wherein the confirmation packet comprises a plurality of bits each associated with a respective packet, the packet being one of: one of the data packets and one of the at least one non-received packet, each bit indicating whether its respective packet has been received.

* * * * *